United States Patent
Maezawa et al.

(10) Patent No.: US 6,333,615 B1
(45) Date of Patent: Dec. 25, 2001

(54) SYNCHRONIZATION CONTROL DEVICE FOR SERVO MOTORS

(75) Inventors: Harumi Maezawa; Yoshio Shinohara, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/446,945
(22) PCT Filed: Jun. 25, 1998
(86) PCT No.: PCT/JP98/02850
§ 371 Date: Mar. 16, 2000
§ 102(e) Date: Mar. 16, 2000
(87) PCT Pub. No.: WO99/01252
PCT Pub. Date: Jan. 14, 1999

(30) Foreign Application Priority Data

Jul. 2, 1997 (JP) .................................. 9-176832

(51) Int. Cl.$^7$ .................................. G05B 11/32
(52) U.S. Cl. ............... 318/625; 318/595; 700/69; 700/188
(58) Field of Search .................. 318/560, 563, 318/564, 565, 567, 569, 590, 595, 625, 68; 82/118; 700/46, 69, 188, 189, 191

(56) References Cited

U.S. PATENT DOCUMENTS

| 4,629,956 | * | 12/1986 | Nozawa et al. | 318/625 |
| 4,985,841 | * | 1/1991 | Iwagaya | 700/191 |
| 5,093,972 | * | 3/1992 | Kaku et al. | 318/68 |
| 5,181,441 | * | 1/1993 | Okada | 82/118 |
| 5,267,142 | * | 11/1993 | Kono et al. | 318/625 |
| 5,555,178 |  | 9/1996 | Hashimoto . |  |

FOREIGN PATENT DOCUMENTS

| 1-228750 | 9/1989 | (JP) . |
| 1-228752 | 9/1989 | (JP) . |
| 2-41693 | 2/1990 | (JP) . |
| 2-109605 | 4/1990 | (JP) . |

\* cited by examiner

*Primary Examiner*—Khanh Dang
(74) *Attorney, Agent, or Firm*—Sughrue Mion, PLLC

(57) ABSTRACT

Position droops produced in main and auxiliary servo motors when main and auxiliary spindles are coupled to each other through a workpiece are obtained by adders, respectively, a difference between those position droops is obtained by a comparator before coupling, a divider divides the position droop difference by the speed of the auxiliary servo motor at the time of detecting the position droop to obtain a position droop difference per a unit speed. Then, after both the spindles are coupled to each other, a multiplier multiplies the position droop difference by the present speed of the auxiliary servo motor, and the adder adds that value to the position command to the auxiliary servo motor. With the above structure, even if coupling is made through the workpiece and synchronization drive is made, an excessive torque can be prevented from occurring, an influence of a change of the change gear ratio with a time is eliminated and a displacement occurring at the time of coupling is corrected.

21 Claims, 15 Drawing Sheets

SYNCHRONIZATION CONTROL DEVICE FOR SERVO MOTORS

TECHNICAL FIELD

The present invention mainly relates to a spindle synchronization drive for a machine tool, and to a synchronization control device for a servo motor which is so designed as to drive a main spindle and an auxiliary spindle which are coupled to and decoupled from each other through a workpiece by a main servo motor and a sub-servo motor, respectively.

BACKGROUND ART

Up to now, a large number of inventions have been made on a spindle synchronization control for a machine tool, for example, as disclosed in Japanese Patent Unexamined Publication No. Hei 1-228750, Japanese Patent Unexamined Publication No. Hei 1-228751, Japanese Patent Unexamined Publication No. Hei 1-228752, Japanese Patent Unexamined Publication No. Hei 2-109605, etc.

All that are disclosed in those publications are inventions for making accurate synchronization by driving those two main spindles by a speed control servo motor when two spindles are decoupled from each other not through a workpiece.

In particular, the invention disclosed in Japanese Patent Unexamined Publication No. Hei 1-228750 discloses a technique by which a speed deviation between both the spindles is detected to make the speed synchronization of those two spindles. The invention disclosed in Japanese Patent Unexamined Publication No. Hei 1-228751 discloses a technique by which synchronization is made additionally using a positional deviation between both the spindles. The invention disclosed in Japanese Patent Unexamined Publication No. Hei 1-228752 discloses a technique by which a torque is employed in addition to the speed and the position. The invention disclosed in Japanese Patent Unexamined Publication No. Hei 2-109605 discloses a technique by which not only the speed of the spindles but also the position thereof is synchronized. Thus, those inventions are designed such that the spindles are driven by the speed control servo motor.

Also, the invention disclosed in Japanese Patent Unexamined Publication No. Hei 2-41693 conducts the positional control by an auxiliary spindle drive servo motor out of two spindle servo motors. However, in the invention, a command is of a position signal from a main spindle position detector, which clearly causes a lag, and both the main and auxiliary spindles are not driven by the same position command.

The reason that most of the prior art drive the spindles by the speed control servo motor as described above is that in the spindle drive servo motor for a machine tool, since there are many cases in which a rated speed is high although the maximum torque is not so large, if the mechanical coupling of both the spindles is made during a period of time until the speed reaches the rated speed since the servo motor starts, or after the speed is greatly changed, the speed control that enables a torque required for increasing or decreasing the speed to be increased or decreased by the maximum torque generated by the motor is advantageous in time.

However, what cannot accurately adjust the change gear ratio between the servo motor and the spindles is required to conduct the control of the spindle per se which serves as a reference, that is, the positional control of the spindle which is a final mechanical edge.

However, the above-described conventional synchronization control device for a servo motor suffers from problems stated below.

When the main spindle and the auxiliary spindle are coupled to each other through a workpiece both ends of which are gripped by chucks, if there is a difference in the total position gain between both the spindles, that is, the position gain pertaining to the operation of the spindles and the change gear ratio between the spindles and the servo motors (the rotating speed of the servo motors/the rotating speed of the spindles), a difference occurs between the position droop of the main and auxiliary spindles. This causes such problems that the torque of one servo motor reaches the torque limit, or if the fastening force of the chucks is weak, the workpiece is displaced and damaged.

In other words, the difference in total gain is caused because an accurate change gear ratio is not obtained in the case where a flexible structure such as a belt is employed for torque transmission between the spindles and the servo motors. Then, if there is a slight difference between the actual change gear ratio and a parameter set on amplifiers of the servo motors, a difference occurs in the above position droop in the position control. On the other hand, a speed difference occurs in case of the speed control.

For the above reason, in any cases, a phase difference occurs within the main and auxiliary servo motors which are coupled to each other, as the result of which the load torque of the servo motors is increased up to the torque limit value, or the workpiece is displaced if the fastening force of the chucks is weak, to thereby damage the workpiece.

In particular, as the representative application method of the spindle synchronization, a work for supporting both ends of the workpiece and cutting a center portion of the workpiece is greatly effective in acceleration of processes after cutting, and since the cutting work is conducted at a constant peripheral speed for the workpiece, the spindle synchronization control that enables the rapid acceleration/deceleration is desirable in a reduction of working time. However, the prior art does not permit even a slight displacement of the above change gear ratio.

Also, in general, since there are many cases in which the chuck of the auxiliary spindle grips the workpiece in a state where the main spindle permits the workpiece to rotate, a large force is exerted on the main and auxiliary spindles and the servo motors at that time, the rotations of the main and auxiliary spindles are lowered, resulting in the event that mechanical coupling is made in a state where the main and auxiliary spindles are displaced from a designed position. In this event, the coupling work of the auxiliary spindle must be made again, thereby leading to such a problem that troublesomeness or time is taken for working.

FIGS. 16 and 17 show a change in a difference of the position droop before and after both of the main and auxiliary spindles are coupled to each other through the workpiece, and a change in a difference of the position droop before and after both of the main and auxiliary spindles are coupled to each other not through the workpiece.

FIG. 17 showing a change in the difference of the position droop when there is no workpiece shows an appearance in which when a work of fastening the chuck on the auxiliary spindle side is made, an extremely large force is exerted on the servo motor on the auxiliary spindle side, with the results that the speed is decreased and the difference of the position droop becomes temporarily large but becomes soon small.

However, in the case where the workpiece is held by the chuck on the main spindle side and a work of fastening the chuck on the auxiliary spindle side is made, coupling may be made at the time when the speed decreases. If the chuck on the auxiliary spindle side is fastened to couple the main and auxiliary spindles to each other in the above manner, the difference between the position droops of the main and auxiliary spindles rises suddenly in a stepped state as shown in FIG. 16 and is continued until the position droop is released till chuck-off since chuck-on.

For that reason, since in the position control, a force that recovers a phase lag is exerted and reaches the torque limit value, it is necessary to correct the lag amount and to try coupling again.

In view of the above, the present invention has been made to solve the above problems, and therefore has an object to provide a synchronization control device for a servo motor, which enables the accurate synchronization driving of a main spindle and an auxiliary spindle and enables a rapid acceleration/deceleration driving even if a difference exists between the position droops of both the spindles when the main spindle and the auxiliary spindle are coupled to each other, and in particular, which can automatically cope with a change in a change gear ratio with a time even if a flexible structure such as a belt is employed for torque transmission between the spindles and servo motors.

DISCLOSURE OF THE INVENTION

In order to achieve the above object, a synchronization control device for a servo motor according to the present invention comprises: a main spindle and an auxiliary spindle each having a chuck that holds both ends of a workpiece and being coupled to or decoupled from each other through the workpiece; a main servo motor and an auxiliary servo motor which rotationally drive the main spindle and the auxiliary spindle, respectively; a main spindle position detector and an auxiliary spindle position detector which are fitted to the main spindle and the auxiliary spindle, respectively, and output a position feedback signal; a main servo motor speed detector and an auxiliary servo motor speed detector which are fitted to the main servo motor and the auxiliary servo motor, respectively, and output a speed feedback signal; a main servo amplifier and an auxiliary servo amplifier which drive the main servo motor and the auxiliary servo motor, respectively; and a numerical control unit which outputs a speed command and a position command to the main servo amplifier and the auxiliary servo amplifier, wherein each of the main servo amplifier and the auxiliary servo amplifier includes: a position control section which outputs a position droop and the speed command responsive to the position droop on the basis of inputs of the position feedback signal from the position detector and the position command from the numerical control unit; a speed control section which outputs a current command on the basis of the speed command from the position control section and the speed feedback signal from the speed detector; and a current control section which controls a supply current to the motor on the basis of the current command from the speed control section and the current feedback signal which flows in the motor, where in the auxiliary servo amplifier further includes a position correction section which obtains position correction data based on a difference in position droop between the main spindle position droop and the auxiliary spindle position droop and the speed feedback signal from the speed detector of the auxiliary servo motor when the main servo motor and the auxiliary servo motor rotate in a state where the main spindle and the auxiliary spindle are decoupled from each other, and wherein the position control section of the auxiliary servo amplifier adds the position correction data from the position correction section to the position droop and outputs the speed command responsive to the position droop obtained by addition when the main spindle and the auxiliary spindle are coupled to each other through the workpiece, and the main servo motor and the auxiliary servo motor rotate in synchronization with each other.

Also, there is characterized in that the position correction section includes: a comparing means for obtaining a position droop difference between the main spindle position droop and the auxiliary spindle position droop when the main servo motor and the auxiliary servo motor rotate in a state where the main spindle and the auxiliary spindle are decoupled from each other; a dividing means for dividing the position droop difference from the comparing means by the speed feedback signal from the speed detector of the auxiliary servo motor; a storing means for storing a division value from the dividing means; a multiplying means for multiplying the division value stored in the memory means by the speed feedback signal from the speed detector of the auxiliary servo motor; and a switch means for switching so as to output, as the position correction data which are outputted to the position control section of the auxiliary servo amplifier, the position droop difference from the comparing means when the main servo motor and the auxiliary servo motor rotate in a state where the main spindle and the auxiliary spindle are decoupled from each other, and to output, as the position correction data which are outputted to the position control section of the auxiliary servo amplifier, a multiplication value from the multiplying means when the main spindle and the auxiliary spindle are coupled to each other through the workpiece, and the main servo motor and the auxiliary servo motor rotate.

Further, there is characterized in that the position correction section includes: a position droop ratio calculating means for calculating the ratio of the position droop of the main spindle to the position droop of the auxiliary spindle when the main servo motor and the auxiliary servo motor rotate in a state where the main spindle and the auxiliary spindle are decoupled from each other; and a storing means for storing the position droop ratio from the position droop ratio calculating means, and the position control section includes: a position droop calculating means for calculating the position droop of the auxiliary spindle on the basis of inputs of the position feedback signal from the position detector and the position command from the numerical control unit; a position gain multiplying means for multiplying the position droop from the position droop calculating means by a position gain of the auxiliary servo motor which is stored in advance; a change gear ratio multiplying means for multiplying a multiplication output from the position gain multiplying means by a change gear ratio of the auxiliary servo motor which is stored in advance; and a change gear ratio correcting means for correcting the change gear ratio by multiplying the change gear ratio which is stored in the change gear ratio multiplying means in advance by the position droop ratio which is stored in the memory means when the main spindle and the auxiliary spindle are coupled to each other through the workpiece, and the main servo motor and the auxiliary servo motor rotate in synchronization with each other.

Still further, there is characterized in that the change gear ratio correcting means includes a filter which subjects the position droop ratio stored in the storing means to a first-order lag processing.

Yet still further, there is characterized in that said position correction section includes: a position droop ratio calculating means for calculating the ratio of the position droop of said main spindle to the position droop of said auxiliary spindle when said main servo motor and said auxiliary servo motor rotate in a state where said main spindle and said auxiliary spindle are decoupled from each other; and a storing means for storing the position droop ratio from the position droop ratio calculating means, and the position control section includes: a position droop calculating means for calculating the position droop of the auxiliary spindle on the basis of inputs of the position feedback signal from the position detector and the position command from the numerical control unit; a position gain multiplying means for multiplying the position droop from the position droop calculating means by a position gain of the auxiliary servo motor which is stored in advance; a change gear ratio multiplying means for multiplying a multiplication output from the position gain multiplying means by a change gear ratio of the auxiliary servo motor which is stored in advance; and a position gain correcting means for correcting the position gain by multiplying the position gain which is stored in the position gain multiplying means in advance by the position droop ratio which is stored in the storing means when the main spindle and the auxiliary spindle are coupled to each other through the workpiece, and the main servo motor and the auxiliary servo motor rotate in synchronization with each other.

Yet still further, there is characterized in that the position gain correcting means includes a filter which subjects the position droop ratio stored in the storing means to a first-order lag processing.

Yet still further, there is characterized in that the position correction section stores, in the storing means, a division value obtained from dividing the position droop difference from the comparing means by the speed feedback signal from the speed detector of the auxiliary servo motor when the main servo motor and the auxiliary servo motor rotate by a predetermined r.p.m. or higher in a state where the main spindle and the auxiliary spindle are decoupled from each other.

Yet still further, there is characterized in that the position correction section stores in the storing means the position droop ratio from the position droop ratio calculating means when the main servo motor and the auxiliary servo motor rotate by a predetermined r.p.m. or higher in a state where the main spindle and the auxiliary spindle are decoupled from each other.

Yet still further, there is characterized in that the position correction section further includes: a switch disposed between the multiplying means and the memory means and being closed when the main servo motor and the auxiliary servo motor rotate in a state where the main spindle and the auxiliary spindle are decoupled from each other and opened when the main spindle and the auxiliary spindle are coupled to each other through the workpiece, and the main servo motor and the auxiliary servo motor rotate; a subtractor which subtracts, from the position droop from the comparing means, the position droop due to the multiplication value from the multiplying means that multiplies the division value stored in the storing means through the switch by the speed feedback signal from the speed detector of the auxiliary servo motor when the main spindle and the auxiliary spindle are coupled to each other through the workpiece, and the main servo motor and the auxiliary servo motor rotate; and a coupling-time displacement correction section which outputs a difference in the position droop between the main spindle and the auxiliary spindle which is obtained from the subtractor and produced before and after the main spindle and the auxiliary spindle are coupled to each other through the workpiece to the position control section as the position correction data.

Yet still further, there is characterized in that the coupling-time displacement correction section further includes: zero data generating means for generating zero data as the position correction data; and an accumulating means for accumulating the position correction data from the subtractor which is produced every time the main spindle and the auxiliary spindle are coupled to each other through the workpiece, wherein when the coupling-time displacement correction section outputs the zero data from the zero data generating means or the position correction data from the accumulating means as the position correction data which are outputted to the position control section immediately after coupling when the main spindle and the auxiliary spindle which have been coupled to each other through the workpiece are decoupled from each other.

Yet still further, there is characterized in that there are provided a comparator which compares the speed command from the position control section with the speed command from the numerical control section, and a command switching means for outputting the speed command from the position control section to the speed control section to conduct position control when a comparison difference is within a given error, and for outputting the speed command from the numerical control section to the speed control section to conduct position control when the comparison difference is not within the given error.

BRIEF DESCRIPTION OF THE DRAWINGS

FIG. 6 is a state explanatory diagram showing a state of the respective switches (SW) at the time of chuck-off and a state of the respective switches at the time of chuck-on in the case of conducting a correction processing where a value of a final droop difference is divided by a final speed and then multiplied by a present speed, immediately before chuck-on.

FIG. 7 is a flowchart showing a correction processing where a final droop value is divided by the final speed and then multiplied by the present speed at the time of chuck-on.

BEST MODES OF CARRYING OUT THE INVENTION

EMBODIMENT 1

Figure 1:
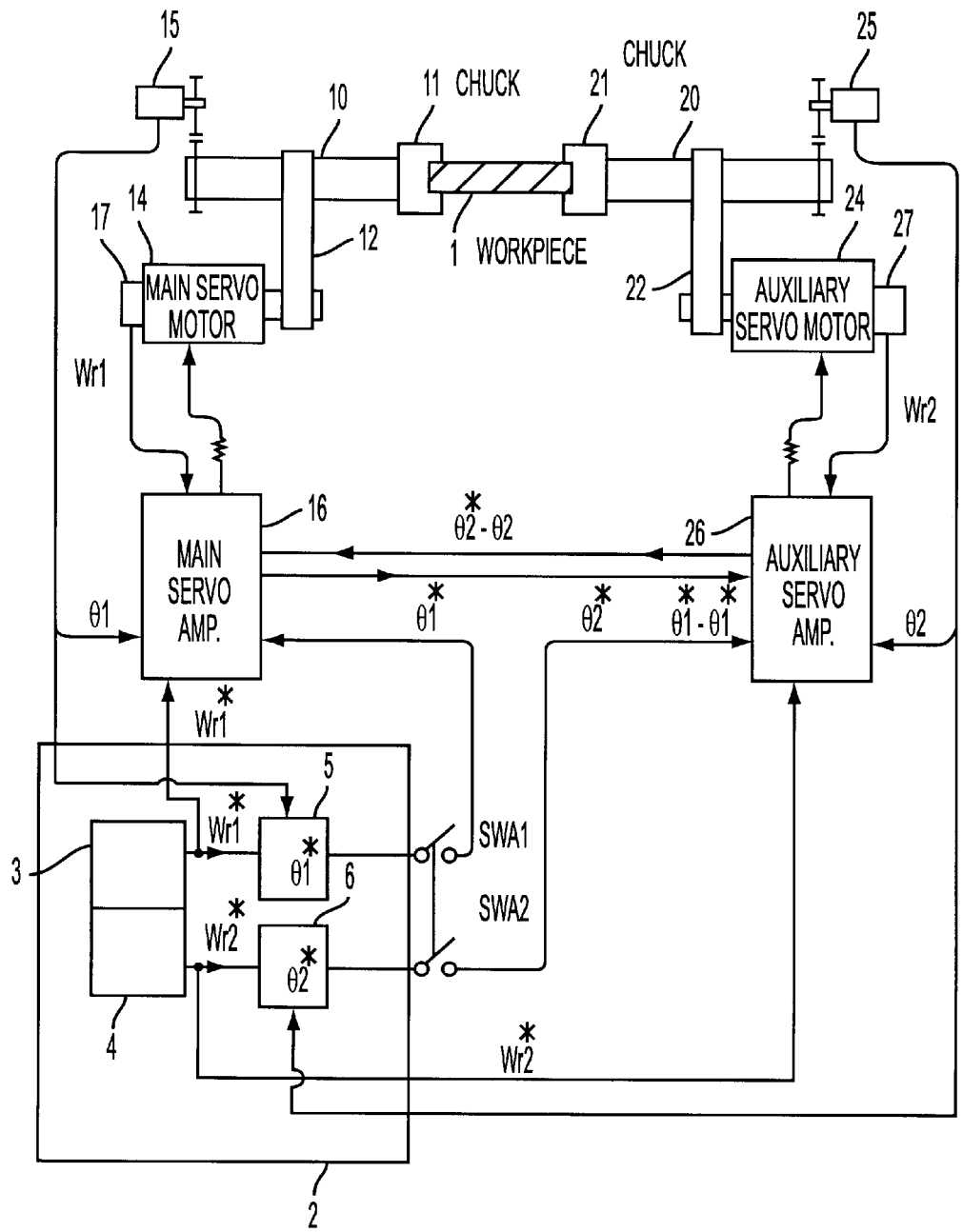
FIG. 1 is a structural diagram showing a synchronization control device for a servo motor in accordance with Embodiment 1 of the present invention.

FIG. 1 is a structural diagram showing a synchronization control device for a servo motor in accordance with Embodiment 1 of the present invention.

Referring to FIG. 1, reference numeral 10 denotes a main spindle, and 14 is a main servo motor that rotates the main spindle 10, where the main spindle 10 and the main servo motor 14 are coupled to each other through a belt 12. Also, reference numeral 20 denotes an auxiliary spindle and 24 is an auxiliary servo motor which are coupled to each other through a belt 22.

Reference numeral 1 denotes a workpiece which is held by a chuck 11 fitted to the main spindle 10 and a chuck 21 fitted to the auxiliary spindle 20. It is needless to say that coupling between the main spindle 10 and the main servo motor 14 and between the auxiliary spindle 20 and the auxiliary servo motor 24 may be made by not the belts 12 and 22 but normal gears.

The main spindle 10 is fitted with a position detector 15 for position feedback. Likewise, the auxiliary spindle 20 is fitted with a position detector 25 for position feedback.

The main servo motor 14 is fitted with a speed detector 17 for speed feedback. Likewise, the auxiliary servo motor 27 is fitted with a speed detector 27 for speed feedback.

Reference numeral 16 denotes a main servo amplifier that drives the main servo motor 14, and 26 is an auxiliary servo amplifier that drives the auxiliary servo motor 26. In this example, each of the main servo amplifier 16 and the auxiliary servo amplifier 26 is made up of a speed control circuit having a microprocessor, a memory and so on, a position control circuit and a power drive circuit having a power transistor and so on.

Reference numeral 2 denotes a numerical control unit (CNC), and 3 is a main spindle speed command producer that produces a speed command Wr1* which is commanded to the main servo amplifier 16 within the numerical control unit (CNC) 2. Reference numeral 5 denotes a main position command producing circuit that converts the speed command signal Wr1* outputted from the main spindle speed command producer 3 into a position command $\theta 1^*$ which is commanded to the main servo amplifier 16.

Also, the main position command producing circuit 5 is so structured as to produce an output signal by also using a position feedback $\theta 1$ outputted from the position detector 15 which is fitted to the main spindle 10 and turns on a switch SWA1 to validate an output to the main servo amplifier 16 when switching the speed control to the position control.

Likewise, reference numeral 4 denotes an auxiliary spindle speed command producer that produces a speed command Wr2* which is commanded to the auxiliary servo amplifier 26, and 6 is an auxiliary position command producing circuit that converts the speed command signal Wr2* into a position command $\theta 2^*$. Also, the auxiliary position command producing circuit 6 turns on a switch SWA2 to validate an output to the auxiliary servo amplifier 26 when switching a speed command to a position command. Further, each of the main servo amplifier 16 and the auxiliary servo amplifier 26 has a function of receiving position droops ($\theta 1^*-\theta 1$, $\theta 2^*-\theta 2$) of the counter servo amplifier.

Figure 2:
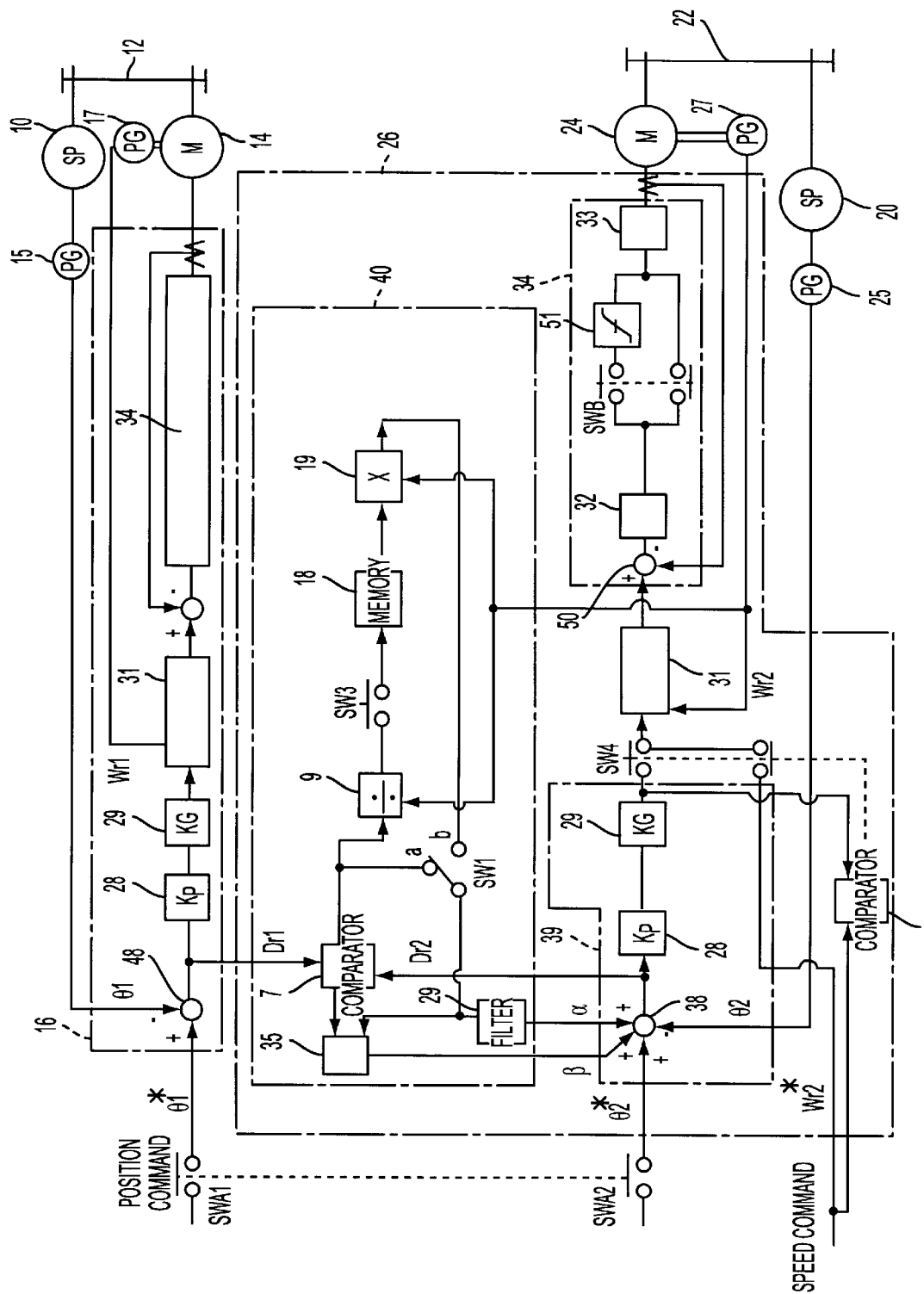
FIG. 2 is a structural diagram showing the structure of a main servo amplifier 16 and an auxiliary servo amplifier 26 in FIG. 1.

FIG. 2 shows a specific structure of the main servo amplifier 16 and the auxiliary servo amplifier 26.

Although the main servo amplifier 16 and the auxiliary servo amplifier 26 are not different in structure from each other, FIG. 2 mainly shows the structure of the auxiliary servo amplifier 26 and represents the structure of the main servo amplifier 16 at the minimum.

Referring to FIG. 2, a description will be mainly given of the structure within the auxiliary servo amplifier 26. The auxiliary servo amplifier 26 includes a position control section 39, a speed control section 31, a current control section 34, a comparator 36 and a position correction section 40. It should be noted that the main servo amplifier 16 has no position correction section 40.

First, the structure within the position control section 39 will be described. Reference numeral 38 denotes an adder that adds the position command $\theta 2^*$ outputted from the numerical control unit (CNC) 2 shown in FIG. 1, a signal a that has passed through a switch SW1 and a filter 29 within the position correction section 40 and a signal β outputted from the coupling-time displacement corrector 35 within the position correction section 40 together and subtracts the position feedback signal θ2 outputted from the position detector 25 therefrom.

Also, reference numeral 28 denotes a position gain multiplier that multiplies an output signal from the adder 38 by a position gain Kp, and 29 is a change gear ratio multiplier that multiplies an output of the position gain multiplier 28 by a change gear ratio KG which is stored in advance, where the output from the change gear ratio multiplier 29 is outputted as a speed command.

The comparator 36 compares the speed command Wr2* outputted from the numerical control unit (CNC) 2 with an output signal from the change gear ratio multiplier 29 and controls a switch SW4 so as to output the speed command from the position control section 39 to the speed control section 31 for conducting position control when a comparison difference is within a given error, and to output the speed command from the numerical control section 2 to the speed control section 31 for conducting speed control when the comparison difference is not within the given error. The switch SW4 is so designed as to switch the speed command inputted to the speed control section 31 according to a command of the comparator 36 which is based on an output signal from the change gear ratio multiplier 29 of the position control section 39 and the speed command Wr2* from the numerical control unit (CNC) 2.

The speed control section 31 is so designed as to subtract the speed command of its input signal from the speed feedback signal Wr2 from the speed detector 27 fitted to the auxiliary servo motor 24 and converts a subtracted value into a current command and output the current command.

The current control section 34 is so designed as to subtract the above current command from the feedback signal of a current that flows in the auxiliary servo motor 24 and processes the signal so that the auxiliary servo motor 24 is driven according to the current command, and to output the processed signal to the auxiliary servo motor 24. As shown in the figure, the current control section 34 includes an adder 50, a current gain section 32, a switch SWB, a limiter 51 and a current amplification section 33.

The position correction section 40 includes a function of producing three kinds of data consisting of data a with respect to first and second kinds of methods for correcting inaccuracy of the change gear ratio and a second kind of data β which are a correction of lag caused at the time of mechanical coupling. The second kind of data β which are caused at the time of mechanical coupling is produced by the coupling-time displacement corrector 35.

Specifically, in the structure within the position correction section 40, reference numeral 7 denotes a comparator that arithmetically operates a difference between the data of the position droop Dr1 (=θ1*-θ1) of the main servo amplifier 16 and the position droop data Dr2 (an out put of the adder 38) of the auxiliary servo amplifier 26. Also, reference numeral 9 denotes a divider which divides the above difference in the position droop which is an output signal from the comparator 7 by the present motor speed of the auxiliary servo motor 24 which is detected by the speed detector (PG) 27 of the auxiliary servo motor 24.

Reference numeral 18 denotes a memory which stores output result of the divider 9 through a switch SW3 therein, and 19 is a multiplier that multiplies the value of the memory 18 by the present motor speed. The output data of the multiplier 19 pass through a switch SW1-b and a filter 29 and are outputted to the adder 38 and the coupling-time displacement corrector 35 as the data α. The comparator 7 arithmetically operates a difference in the position droop between the position droop of the coupled main servo motor 14 and itself (auxiliary servo motor 24) and transmits the difference to the adder 38 through the switch SW1 and the filter 29 to correct the position command of the auxiliary servo motor 24.

However, the correcting method is effective when the main and auxiliary servo motors 14 and 24 are decoupled from each other, but ineffective when they are coupled to each other through the workpiece 1 and conduct acceleration/deceleration control because of lag. In this case, a position displacement may occur to the degree that the torque rises up to a torque limit value. Accordingly, a desired control can be made by using the difference between both the position droops which is obtained before coupling in a feed-forward manner, that is, as a predetermined constant.

Reference numeral 35 denotes a coupling-time displacement corrector that compares the output data of the comparator 7 with data from the multiplier 19 through the switch SW1-b in a subtraction manner. The output signal from the coupling-time displacement corrector 35 is outputted to the adder 38 through an internal filter as the data β.

Figure 3:
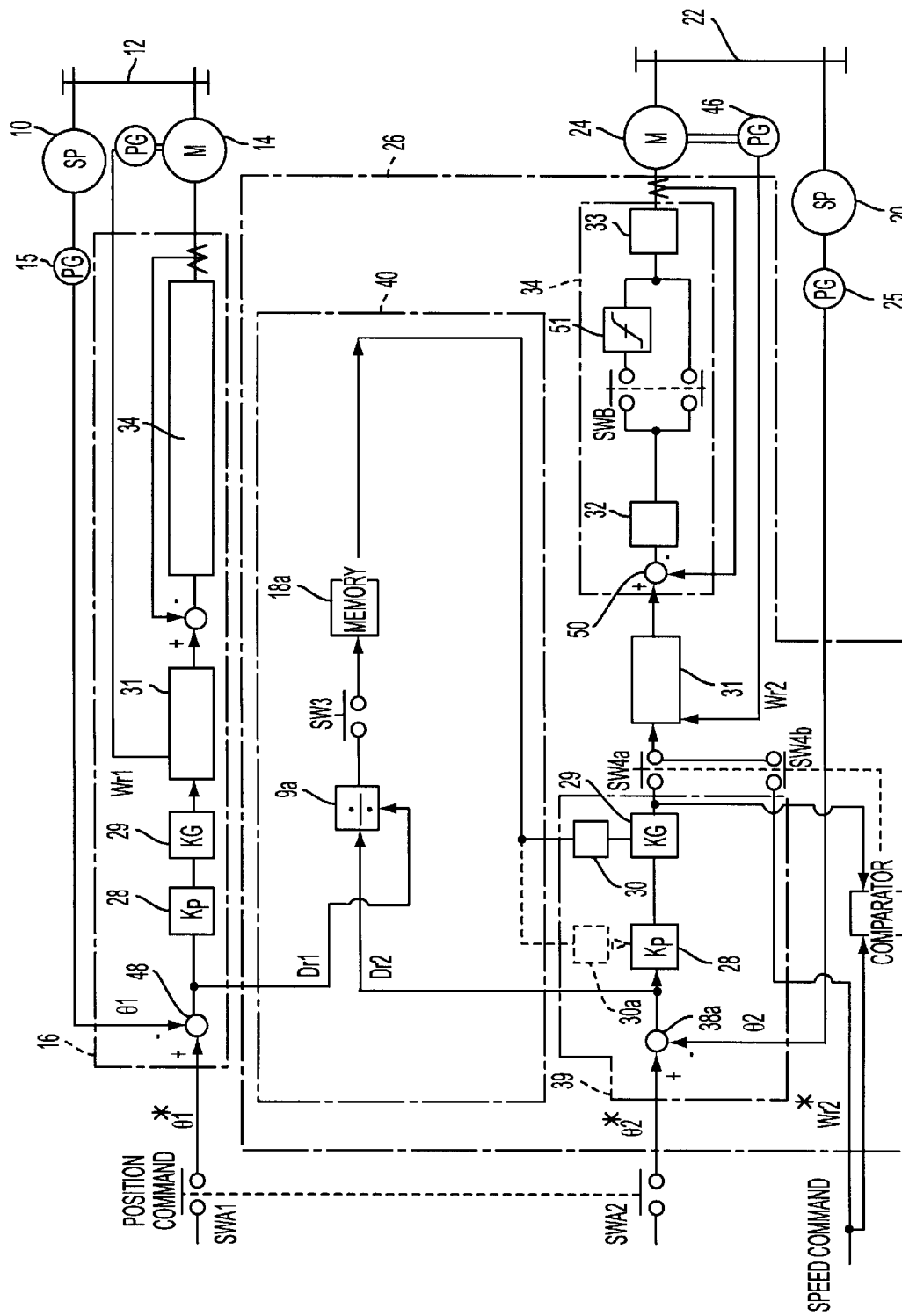
FIG. 3 is a structural diagram showing a modified example of the main servo amplifier 16 and the auxiliary servo amplifier 26 in FIG. 1.

FIG. 3 shows a modified example of the auxiliary servo amplifier 26 shown in FIG. 2 where the structures within the position correction section 40 and the position control section 39 are different from those in FIG. 2.

Referring to FIG. 3, the same parts as the structures shown in FIG. 2 are designated by identical references, their descriptions will be omitted and only new references will be described.

In the structure of the position correction section 40, reference 9a denotes a divider that divides the data of the position droop Dr2 (=θ2*-θ2) of the auxiliary servo amplifier which are outputs of an adder 38a by the data of the position droop Dr1 (=θ1*-θ1) of the main servo amplifier 16 which are outputs from an adder 48, and 18a is a memory that inputs and stores its result through the switch SW3 therein.

In the structure of the position control section 39, reference numeral 30 and 30a denote a change gear ratio correction section that corrects a value of the change gear ratio KG of the change gear ratio multiplier 29 and a position gain correction section that corrects a value of the position gain KP of the position gain multiplier 28, on the basis of a signal from the memory 18a within the position correction section 40, respectively. The change gear ratio correction section 30 and the position gain correction section 30a have a filter that conducts a first-order lag processing inside thereof, respectively. Reference numeral 38a denotes an adder that obtains the data of the position droop Dr2 (=θ2*-θ2) of the auxiliary servo amplifier.

Figure 4:
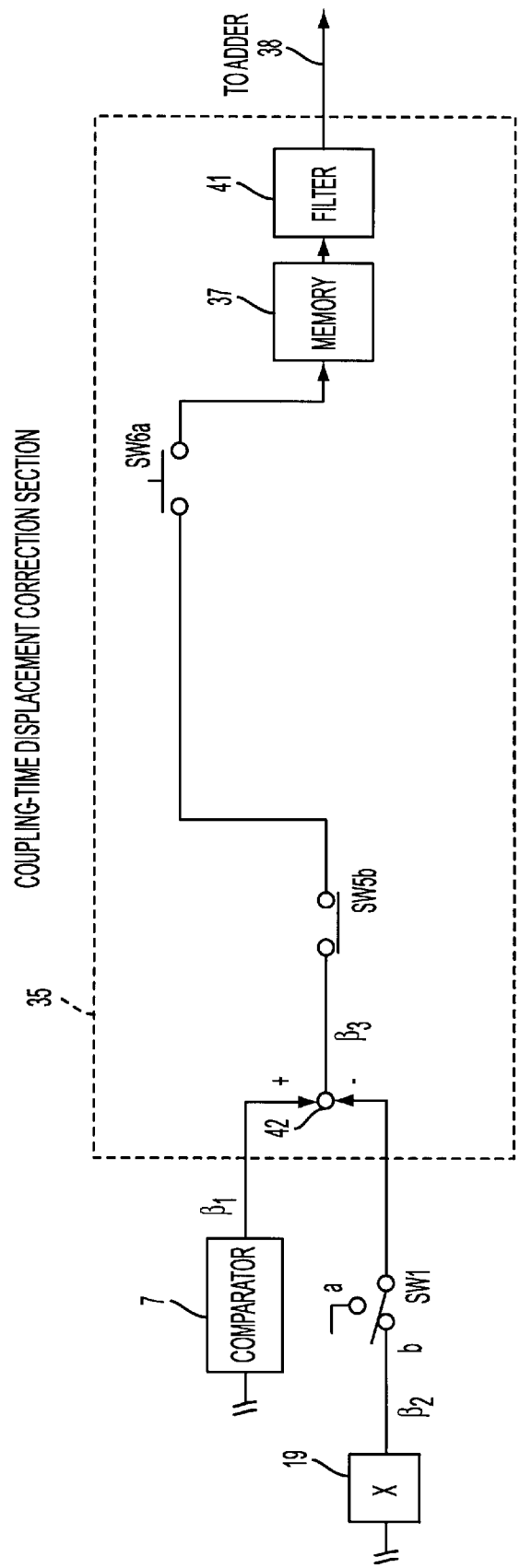
FIG. 4 is a structural diagram showing of a coupling-time displacement correction section 35 shown in FIG. 2 in detail.

Subsequently, FIG. 4 shows of the coupling-time displacement correction section 35 shown in FIG. 2 in detail.

Referring to FIG. 4, reference numeral 42 denotes an adder which subtracts an output of a difference in the position droop between the main servo amplifier 16 and the auxiliary servo amplifier 26 which is the output data from the comparator 7 from the data outputted from the multiplier 19 through the switch SW1, and 37 is a memory which stores the output data of the adder 42 through switches SW5b and SW6a therein. Reference numeral 41 denotes a filter that varies a change in the data stored in the memory 37 in a first-order manner, which is outputted to the adder 38 shown in FIG. 2.

Figure 5:
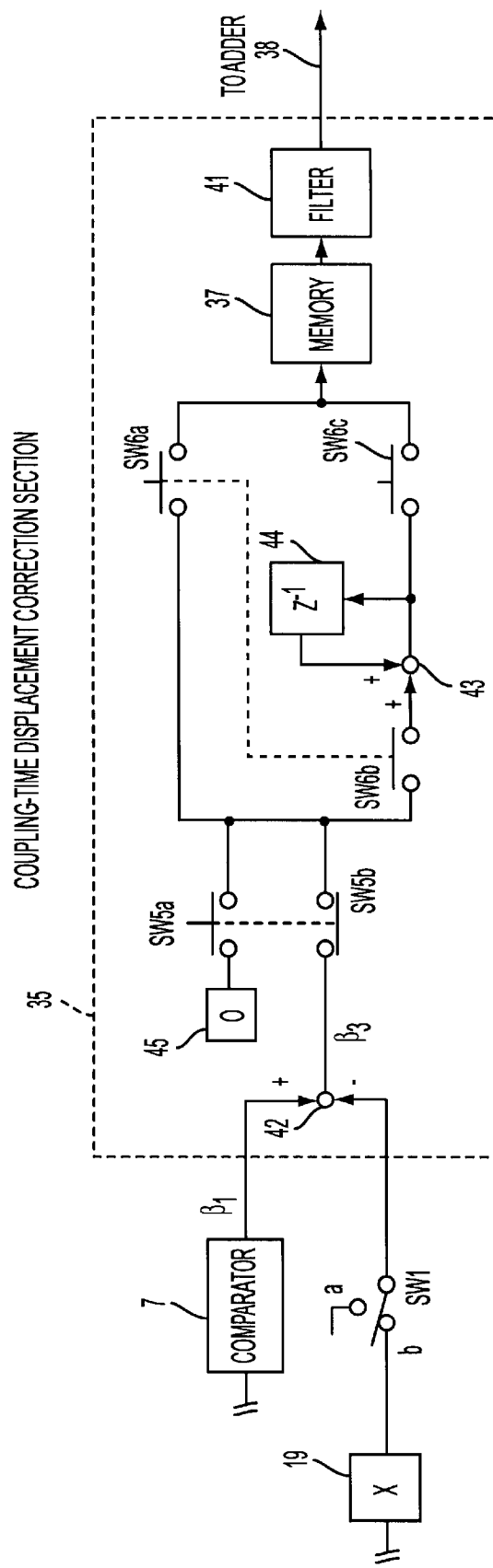
FIG. 5 is a structural diagram showing a modified example of the coupling-time displacement correction section 35 shown in FIG. 2 in detail.

Also, FIG. 5 shows a modified example of the coupling-time displacement correction section 35 shown in FIG. 2, which is different from that of FIG. 4. A circuit in which switches SW5a, SW6b and SW6c are normally off in FIG. 5 is directed to that of FIG. 4.

Referring to FIG. 5, when the stored contents in the memory 37 are cleared to 0, 0 is stored in the memory 37 through the switches SW5a and Sw6a by a zero setting section 45. Also, reference numeral 43 denotes an adder that adds the output value from the adder 42 to the output data of the memory 44 through the switches SW5b and SW6b, and the memory 44 stores its result therein.

In this example, the adder 43 and the memory 44 function as an integrator, and the output data of the integrator are stored in the memory 37 when the switch SW6c is on (in this situation, the switch SW6a is off).

Then, the operation of this Embodiment 1 will be described.

The operation of the Embodiment 1 includes the following six kinds of processings.

(1) A correction processing where a value of a final droop difference is divided by a final speed and then multiplied by a present speed immediately before chuck-on.

(2) A correction processing where the ratio of the position droop of the auxiliary servo motor to the position droop of the main servo motor is multiplied by the change gear ratio of the auxiliary servo motor or a position loop gain.

(3) A processing where a value obtained by dividing the value of the final droop difference by the final speed in item (1) is stored by a predetermined r.p.m. or higher.

(4) A correction processing where a difference value in the droop difference between the main servo motor and the auxiliary servo motor at the time of chuck-on and chuck-off is added to the position command of the auxiliary servo motor.

(5) A processing of selecting a function of setting a correction added to the position command of the auxiliary spindle servo motor to 0 immediately after coupling, and a function of accumulating a displacement produced in each coupling to correct the position command of the auxiliary spindle servo motor without returning the position to a position immediately before coupling, when the two main and auxiliary servo motors which have been coupled to each other through the workpiece are decoupled from each other.

(6) A processing that can change the speed control to the position control and vice versa when the speed command is within a predetermined error.

Therefore, each of the processings will be described below.

(1) A correction processing where a value of a final droop difference is divided by a final speed and then multiplied by a present speed immediately before chuck-on.

Figure 6:
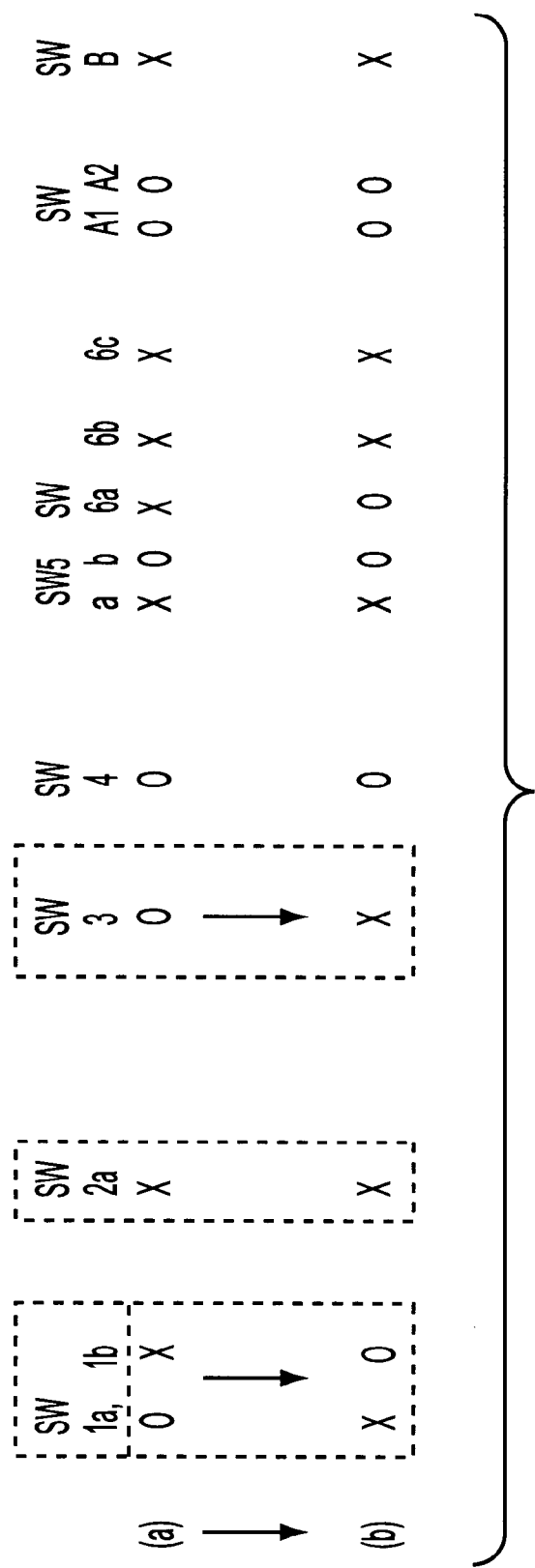

FIG. 6 shows a state of the respective switches (SW) at the time of chuck-off (refer to (a)) and a state of the respective switches at the time of chuck-on (refer to (b)) in the case of conducting this processing. In the figure, "O" represents a switch-on state, and "X" represents a switch-off state.

Figure 7:
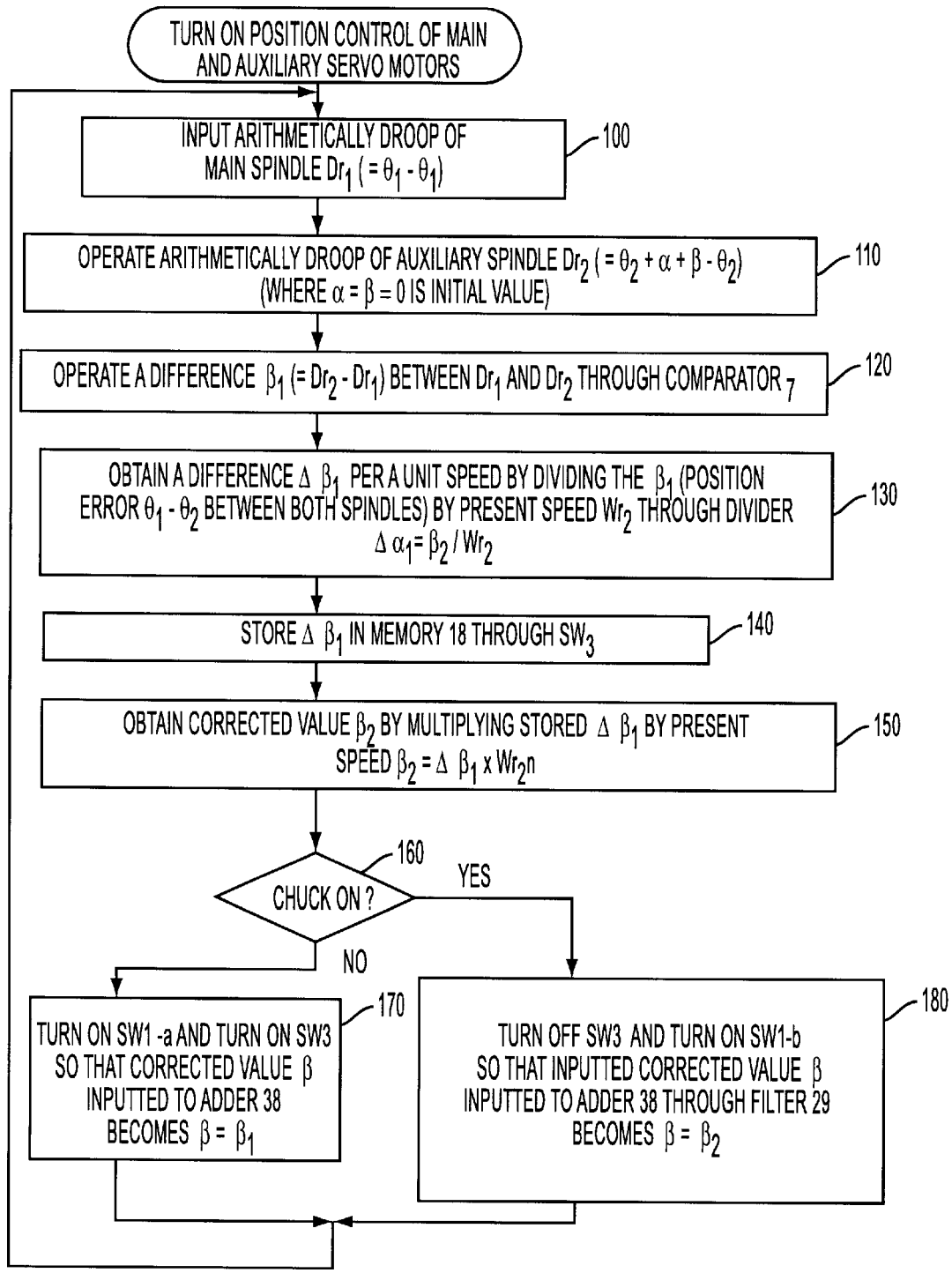

FIG. 7 shows the contents of the correction processing (1) where the value of the difference in the final droop is divided by the final speed and then multiplied by the present speed.

In this processing, both of the main and auxiliary servo motors 14 and 24 turn on the position control, and first of all, the main servo amplifier 16 arithmetically operates the droop Dr1 (=θ1*−θ1) of the main spindle 10 (step 100), and the auxiliary servo amplifier 26 arithmetically operates the droop Dr2 (=θ2*+α+β−θ2) of the auxiliary spindle 20 (step 110). Where α=β=0 is set as an initial value.

In this situation, the switches SWA1, SWA2, SW1-a, SW3, SW4 and SW5-b are on, and all of the switches SW1-b, SW2a, SW5a, SW6a, SW6b and SW6c are off.

Then, the comparator 7 arithmetically operates a difference β1 (=Dr1−Dr2) bet ween the droop Dr1 of the main spindle 10 and the droop Dr2 of the auxiliary spindle 20 (step 120). If θ2*=θ1*, β1 (=Dr1−Dr2) becomes (θ2*−θ2)−(θ1*−θ1)=θ1−θ2.

Then, the divider 9 divides the difference β1 in the position droop between both the spindles which is obtained in the previous step 120, that is, the position error (θ1−θ2) of both the spindles by the present rotating speed Wr2 of the auxiliary spindle servo motor 24 which is detected by the speed detector (PG) 27, thus obtaining a difference Δβ1 (=β1/Wr2) per a unit speed (step 130).

Then, the difference Δβ1 per a unit speed is stored in the memory 18 through the switch SW3 (step 140), and the multiplier 19 multiplies the difference Δβ1 thus stored by the present rotating speed Wr2n of the auxiliary spindle servo motor 24 which is detected by the speed detector (PG) 27, to thereby obtain a corrected value β2 (=Δβ1×Wr2n) (step 150). In the case where the auxiliary servo motor 24 rotates at a constant speed, if the switch SW3 is on, β1 =β2 is satisfied because of Wr2=Wr2n, whereas if the switch SW3 is off, Wr2≠Wr2n is satisfied and β1≠β2 is satisfied because Δβ1 is a constant value.

Subsequently, it is judged whether the chucks 11 and 21 of both the spindles 10 and 20 turn on and both the spindles 11 and 21 are connected to each other through the workpiece 1, or not (step 160). If the chucks 11 and 21 are off ("no" in step 160), since the switch SW1-a is on and the SW1-b is kept off, the corrected value β which is inputted to the adder 38 becomes β1 obtained by the comparator 7 in the above step 120 (step 170).

On the other hand, if the chucks 11 and 21 are on ("yes" in step 160), since the switch SW3 is turned off, the SW1a is turned off, the SW1b is turned on and the SW2b is kept on, the corrected value β which is inputted to the adder 38 becomes β2 obtained by multiplying the difference Δβ1 stored in the memory 18 by the present rotating speed Wr2n of the auxiliary spindle servo motor 24 which is detected by the speed detector (PG) 27 through the multiplier 19 (step 180).

The more details will be described. Referring to FIG. 2, the adder 38 of the position control section 39 subjects the position command θ2* to the auxiliary spindle 20, the position information of the auxiliary spindle 20 from the detector 25 and two kinds of data which correct a difference in position between the main spindle 10 and the auxiliary spindle 20 to addition and subtraction to constitute a position loop. In this example, two kinds of data is directed to a first kind of data a that correct the inaccuracy of the change gear ratio and a second kind of data β that correct a position lag due to a load caused at the time of mechanical coupling.

When the measurement conditions of data are satisfied, and when the conditions are not satisfied by the switch that turns on, the memory 18 is not rewritten. If the main and auxiliary spindles 10 and 20 are coupled to each other, a product of the data stored in the memory 18 and the speed of the auxiliary servo motor 24 is arithmetically operated by the multiplier 19 without using the data from the comparator 7. The operated result is outputted through the filter 29 and added to the position command for conducting correction. The first method of the first kind in the processing (1) always requires the arithmetic operation of the corrected data during speed changing.

Therefore, in the processing (1) of the synchronization control device in accordance with this embodiment 1, a difference in the position droop between both the servo motors 14 and 24 when the main spindle 10 and the auxiliary spindle 20 are coupled to each other through the workpiece 1 is grasped before coupling. Then, after both the spindles 10 and 20 are coupled to each other, the corrected value α2 obtained by multiplying the difference in the position droop per a unit speed of the auxiliary servo motor 24 before coupling by the present speed of the auxiliary servo motor 24 in a feed-forward manner, that is, in a manner the data are installed in arithmetic operation in advance without any lag on the basis of the respective position droops of the main servo motor 14 and the auxiliary servo motor 24 which are grasped before coupling is added to the position command of the auxiliary servo motor 24 to conduct correction. As a result, even in the acceleration/deceleration state, the complete synchronization control can be conducted.

(2) A correction processing where the ratio of the position droop of the auxiliary servo motor to the position droop of the main servo motor is multiplied by the change gear ratio of the auxiliary servo motor or a position loop gain.

Figure 8:
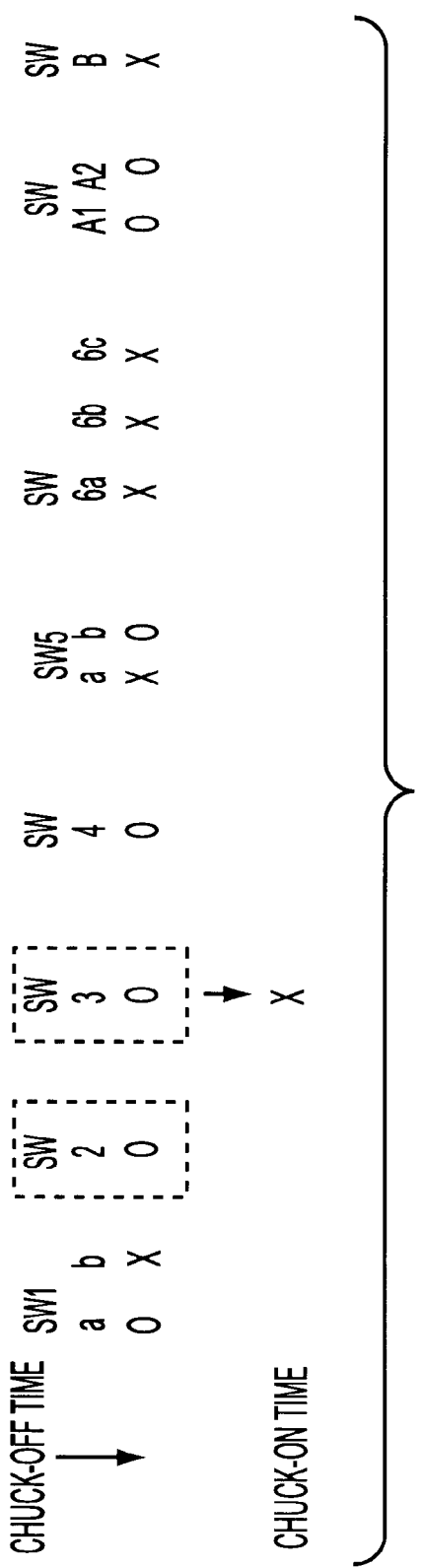
FIG. 8 is a state explanatory diagram showing a state of the respective SWs in the case of conducting a correction processing where a ratio of the position droop of an auxiliary servo motor to the position droop of a main servo motor is multiplied by a change gear ratio of the auxiliary servo motor.

FIG. 8 shows a state of the respective SWs in the case of conducting a correction processing (2) where a ratio of the position droop of the auxiliary servo motor to the position droop of the main servo motor is multiplied by the position gain of the auxiliary servo motor.

FIG. 8 shows a state at the chuck-off time and a state at the chuck-on time, and shows that only the switch SW3 switches from on-state to off-state when chuck-on is made.

Figure 9:
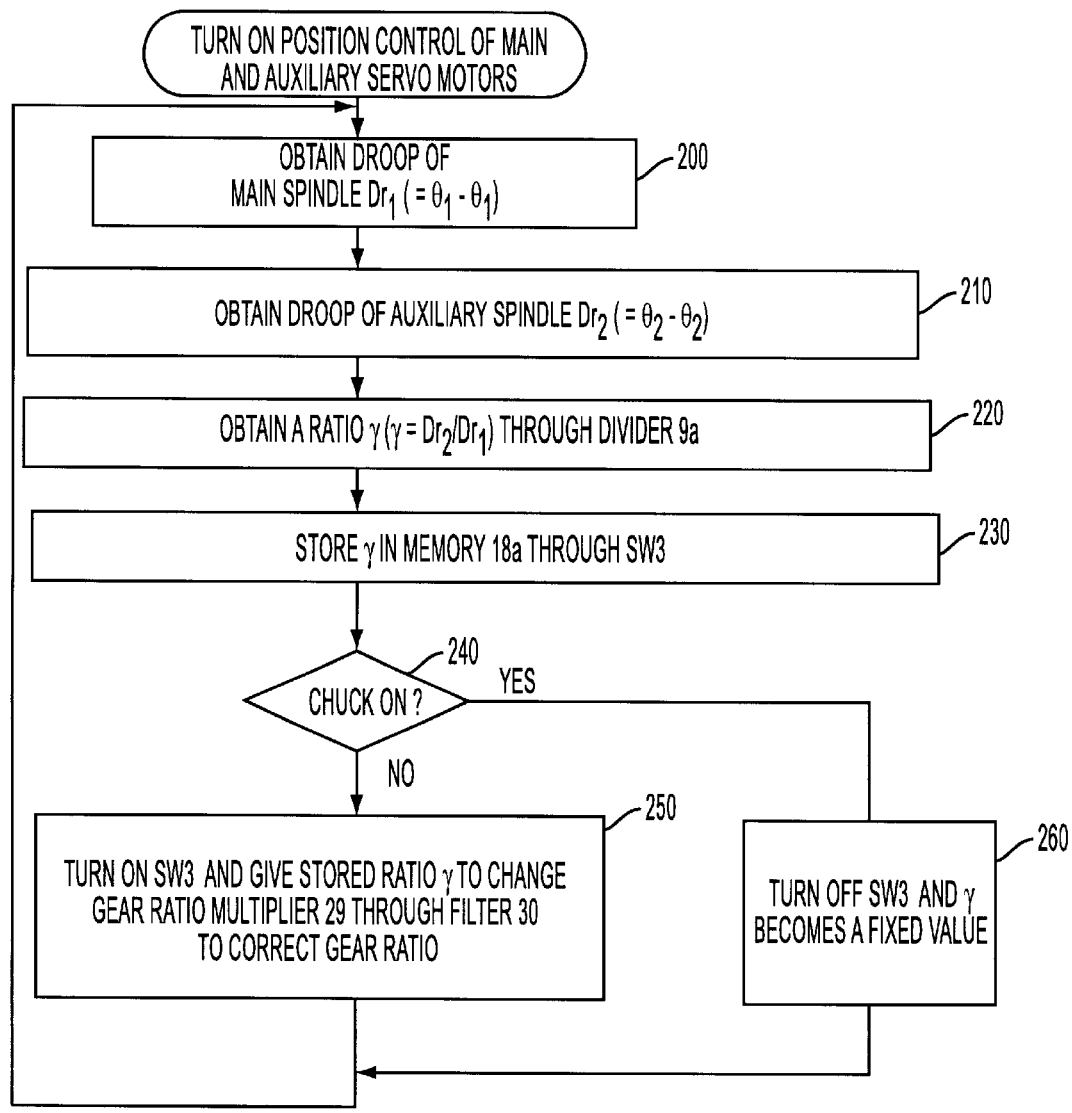
FIG. 9 is a flowchart showing a state of the switches shown in FIG. 8 and a correction processing where the ratio of the position droop of the auxiliary servo motor to the position droop of the main servo motor shown in FIG. 3 is multiplied by the change gear ratio of the auxiliary servo motor or a position loop gain.

For that reason, if the states of the respective switches SW are set in this way, the respective structures function as shown in FIGS. 3 and 9, and there is obtained the ratio in the position droop between the main servo motor 14 and the auxiliary servo motor 24 (the value of the auxiliary servo motor is a denominator) which is obtained while the main servo motor 14 and the auxiliary servo motor 24 are decoupled from each other through the workpiece 1 and drive. When the main spindle 10 and the auxiliary spindle 20 are coupled to each other through the workpiece 1, and the main servo motor 14 and the auxiliary servo motor 24 rotate, the total position gain (position gain×change gear ratio) of the auxiliary servo motor 24 can be multiplied by the ratio of the position droop of the auxiliary servo motor to the position droop of the main servo motor.

FIG. 9 shows the detailed correction processing (2) where the ratio of the position droop of the auxiliary servo motor to the position droop of the main servo motor is multiplied by the change gear ratio of the auxiliary servo motor.

In this processing, both of the main and auxiliary servo motors 14 and 24 turn on the position control, and first of all, the main servo motor 14 arithmetically operates the position droop Dr1 (=θ1*−θ1) of the main spindle 10 (step 200), and the auxiliary servo amplifier 26 arithmetically operates the position droop Dr2 (=θ2*−θ2) of the auxiliary spindle 20 (step 210).

In this situation, the switches SW3 and SW4a are on, and all of other switches are off.

Then, the divider 9a obtains the ratio γ of the position droops of both the spindles which are obtained in the previous steps 200 and 210 (γ=Dr2/Dr1) (step 220). Further, the ratio γ is stored in the memory 18a through the switch Sw3 (step 230).

Subsequently, it is judged whether the chucks 11 and 21 of both the spindles 10 and 20 turn on and both the spindles 11 and 21 are connected to each other through the workpiece 1, or not (step 240). If the chucks 11 and 21 are off ("no" in step 240), the switch Sw3 is kept on, and the stored ratio γ is further given to the change gear ratio multiplier 29 through the change gear ratio correction section 30 including a first-order lag processing filter therein to correct the change gear ratio (step 250). Thereafter, the operation returns to the step 200, and the above operation is repeated until the chucks turn on.

On the other hand, if the chucks 11 and 21 are on ("yes" in step 240), since the switch SW3 is turned off and storage of data in the memory 18a through the switch SW3 is interrupted from the next time, the ratio γ is a fixed value (step 260). Thereafter, the operation returns to the step 200, and the above operation is repeated until the chucks turn off.

That is, the third kind of correcting method shown in the correction processing (2) does not require the change during speed changing if correction is completed at once, but requires an increase in the number of significant figures of the related memory since the change gear ratio is slight to the degree of slightly less than 1% even though it is inaccurate, with the result that the costs increase as much. Thus, the correction processing (2) has an advantage and a disadvantage which are not obtained in the correction processing (1).

However, in case of the third kind of correcting method in the correction processing (2), the divider 9a arithmetically operates the ratio of the position droop of the main servo motor 14 and the position droop of the auxiliary servo motor 24 (the data of the auxiliary servo motor is a denominator), and the ratio of the position droop is transmitted to the change gear ratio correction section 30 through the memory 18a. The change gear ratio correction section 30 subjects the ratio of the position droops inputted by the filter built in the change gear ratio correction section 30 to a first-order lag processing to prevent a transitional fluctuation, produces a product of the change gear ratio stored in the change gear ratio multiplier 29 and the transmitted position droop ratio, obtains the corrected change gear ratio and gives it to the change gear ratio multiplier 29. The change gear ratio multiplier 29 multiplies the change gear ratio newly corrected by the output from the position gain multiplier 28 and outputs the multiplied value as a speed command.

The position gain correction section 30a may be provided instead of the above change gear ratio correction section 30. In other words, the position gain correction section 30a subjects the ratio of the position droops inputted by the filter built in the position gain correction section 30a to a first-order lag processing to prevent a transitional fluctuation, produces a product of the position gain within the position gain multiplier 28 and the transmitted position droop ratio, obtains the corrected position gain and gives it to the position gain multiplier 28. The position gain multiplier 28 multiplies the position gain newly corrected by the output from the adder 38a and outputs the multiplied value to the change gear ratio multiplier 29.

Therefore, in the correction processing (2) of the synchronization control device in accordance with the embodiment 1, since the position correction is made in the feed-forward manner, after the main servo motor 14 and the auxiliary servo motor 24 are coupled to each other through the workpiece, accurate synchronization drive is enabled even if rapid acceleration and rapid deceleration is made.

(3) A processing where a value obtained by dividing the value of the final droop difference by the final speed in item (1) is stored by a predetermined r.p.m. or higher.

The conditions under which data are stored in the memory 18 or the memory 18a in FIG. 2 or 3 in the above description, and the conditions under which data are stored in the memory in the step 140 of FIG. 7 or in the step 230 of FIG. 9 are that storage is executed by a given r.p.m. or higher.

This causes such problems that if the r.p.m. is too low, a large variation occurs in the divided result of the divider 9a due to a slight fluctuation of the position droop difference, and if the r.p.m. approaches to 0, the value of the divided result is excessive according to circumstances and overflow occurs in a digital processing.

Therefore, the r.p.m. is determined so that the divided result is stabilized, and data are stored with that r.p.m. or the higher as the conditions.

(4) A correction processing where a difference value in the droop difference between the main servo motor and the auxiliary servo motor at the time of chuck-on and chuck-off is added to the position command of the auxiliary servo motor.

Figure 10:
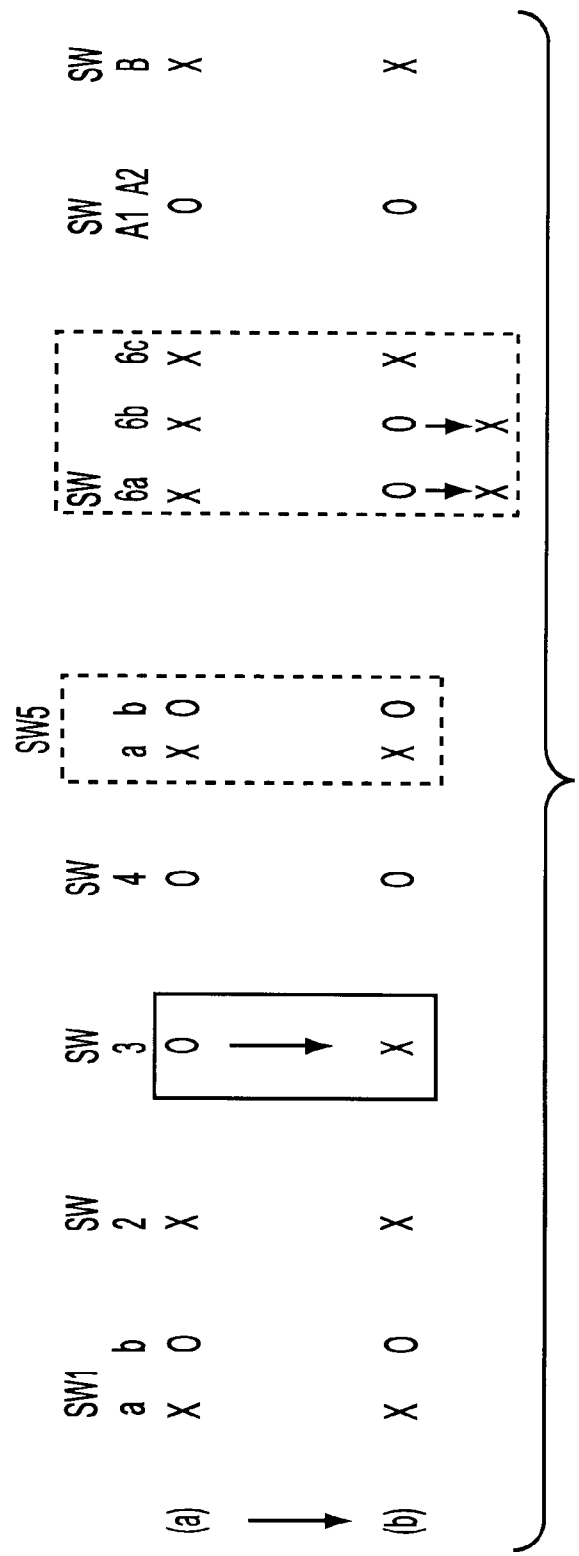
FIG. 10 is a state explanatory diagram showing a state of the respective SWs in the case of conducting a correction processing where a difference value in the droop difference between the main servo motor and the auxiliary servo motor at the time of chuck-on and chuck-off is added to the position command of the auxiliary servo motor.

FIG. 10 shows a state of the respective switches SW in the case of conducting a correction processing where a difference value in the droop difference between the main servo motor and the auxiliary servo motor at the time of chuck-on and chuck-off is added to the position command of the auxiliary servo motor.

(a) shows a state of the respective switches SW when obtaining the position droop reference value at the time of chuck-off, and (b) shows a state of the respective switches SW when further correcting a difference between the droop reference value at the time of chuck-on and the position droop reference value at the time of chuck-off. In case of the correction processing (4), only the structures shown in FIGS. 11 and 4 are required as in the above correction processing (1).

Figure 11:
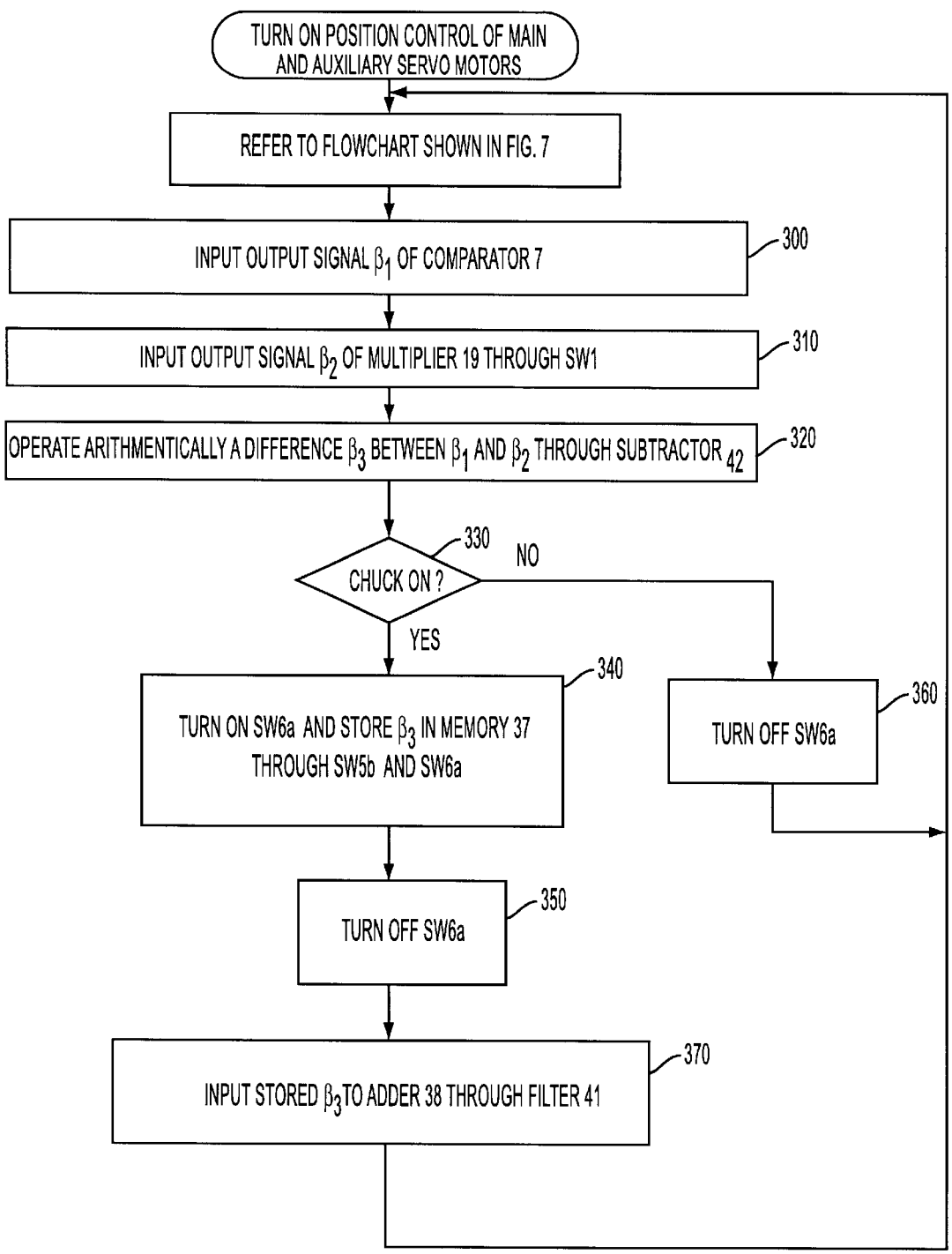
FIG. 11 is a flowchart showing a state of the switches shown in FIG. 10 and a correction processing where a difference value in the droop difference between the main servo motor and the auxiliary servo motor at the time of chuck-on and chuck-off are added to the position command of the auxiliary servo motor.

FIG. 11 shows a correction processing (4) where a difference value in the position droop difference between the main servo motor and the auxiliary servo motor at the time of chuck-on and chuck-off is added to the position command of the auxiliary servo motor.

In the processing, the output signal $\beta 1$ of the comparator 7 that obtains the position droop difference between the main servo amplifier and the auxiliary servo amplifier is inputted after the processing of the flowchart shown in FIG. 7 (step 300), and the output signal $\beta 2$ of the multiplier 19 that obtains a product of the present rotating speed is inputted to the memory 18 through the SW1-b (step 310). In this situation, the switch SW5b is kept on. Then, a difference $\beta 3$ between $\beta 1$ and $\beta 2$ ($=\beta 1-\beta 2$) is arithmetically operated in the subtractor 42 (step 320).

Subsequently, it is judged whether the chucks 11 and 21 of both the spindles 10 and 20 turn on and both the spindles 11 and 21 are connected to each other through the workpiece 1, or not (step 330). If the chucks 11 and 21 are off ("no" in step 330), the switch SW6a is turned off, and the connection of the output signal $\beta 3$ of the subtractor 42 to a succeeding block is interrupted (step 360). Thereafter, the operation returns to the initial operation and the above operation is repeated until the chucks turn on.

On the other hand, if the chucks 11 and 21 are on ("yes" in step 330), since the switch SW6a is turned on and the output signal $\beta 3$ is stored in the memory 37 through the switches SW5b and SW6a (step 340). Then, the switch SW6a is turned off (step 350). Therefore, the value in the memory 37 becomes a fixed value until the succeeding chucks turn on because the switch SW6a turns on at once.

Then, the output signal $\beta 3$ stored in the memory 37 is inputted to the adder 38 through the filter 41 (added to the position command of the auxiliary servo motor) (step 370). Thereafter, the operation returns to the initial operation, and the above operation is repeated until the chucks turn on again.

With the above operation, a change (a value after coupling—a value before coupling) in a difference in the position droop between the main servo motor and the auxiliary servo motor (the position droop of the main servo motor and the position droop of the auxiliary servo motor) immediately after the main spindle and the auxiliary spindle are coupled to each other through the workpiece, before coupling and after coupling, can be added to the position command of the auxiliary servo motor according to the states of the respective switches SW.

Therefore, in the processing (4) of the synchronization control device in accordance with the embodiment 1, in the case where the main and auxiliary spindles are coupled to each other through the workpiece in a state where the servo motors are driven to conduct synchronization control, coupling of the spindles 10 and 20 to each other in a displaced state can be prevented although the coupling is experientially frequently made in the displaced state as a result of coupling in a state where a displacement occurs during coupling work even if the servo motors are completely synchronized with each other before coupling.

(5) A processing of selecting a function of setting a correction added to the position command of the auxiliary spindle servo motor to 0 immediately after coupling, and a function of accumulating a displacement produced in each coupling to correct the position command of the auxiliary spindle servo motor without returning the position to a position immediately before coupling, when the two main and auxiliary servo motors which have been coupled to each other through the workpiece are decoupled from each other.

The case of the correction processing (5) requires only the structure shown in FIG. 5 as in the above correction processing (1).

Figure 12:
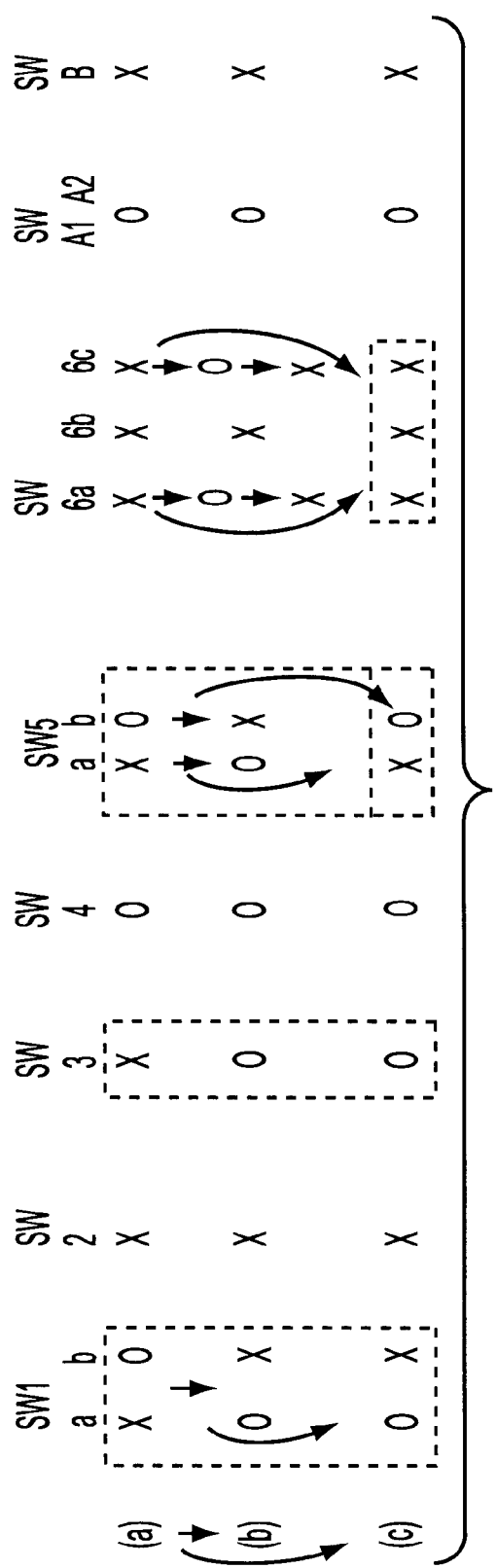
FIG. 12 is a state explanatory diagram showing a state of the respective SWs in the case of conducting a processing of selecting a function of setting a correction added to the position command of the auxiliary spindle servo motor to 0 immediately after coupling, and a function of accumulating a displacement produced in each coupling to correct the position command of the auxiliary spindle servo motor.

FIG. 12 shows a state of the respective switches SW in the case of conducting a processing of selecting a function of setting a correction added to the position command of the auxiliary spindle servo motor to 0 immediately after coupling, and a function of accumulating a displacement produced in each coupling to correct the position command of the auxiliary spindle servo motor without returning the position to a position immediately before coupling.

Referring to FIG. 12, (a) shows a state of the respective switches SW at the time of chuck-on in the case where this processing is conducted, (b) shows a state of the respective switches SW at the time of chuck-off in the case where this processing is conducted, and (c) shows a state of the respective switches SW at the time of accumulating the displacement without returning correction at the time of chuck-off in the case where this processing is conducted. Selection can be made from (a) to (b) or from (a) to (c).

With the switching of the respective switches SW in the above state, according to the synchronization control device of this embodiment, when the servo motors which have been coupled to each other through the workpiece are decoupled from each other, a function of returning a correction added to the position command of the auxiliary servo motor to zero immediately after coupling, and a function of correcting the position command of the auxiliary servo motor with the accumulated value of the displacements produced every time coupling is made as a corrected value at the time of coupling without correcting the position command at the time of decoupling.

The more details will be described. As shown in FIGS. 5 and 12, the coupling-time displacement correction section

35 shown in FIG. 5 arithmetically operates data obtained by subtracting a value based on the inaccuracy of the change gear ratio from the difference in the position droop between both the servo motors, and the switches SW6a and SW6c are switches that turn on only once immediately after coupling is completed (read data) and read zero when coupling is released by the switches SW5a and SW6a/c. Also, the read data are stored in the memory 37 and transmitted to the adder 38 through the filter 41 to correct the position command.

Figure 13:
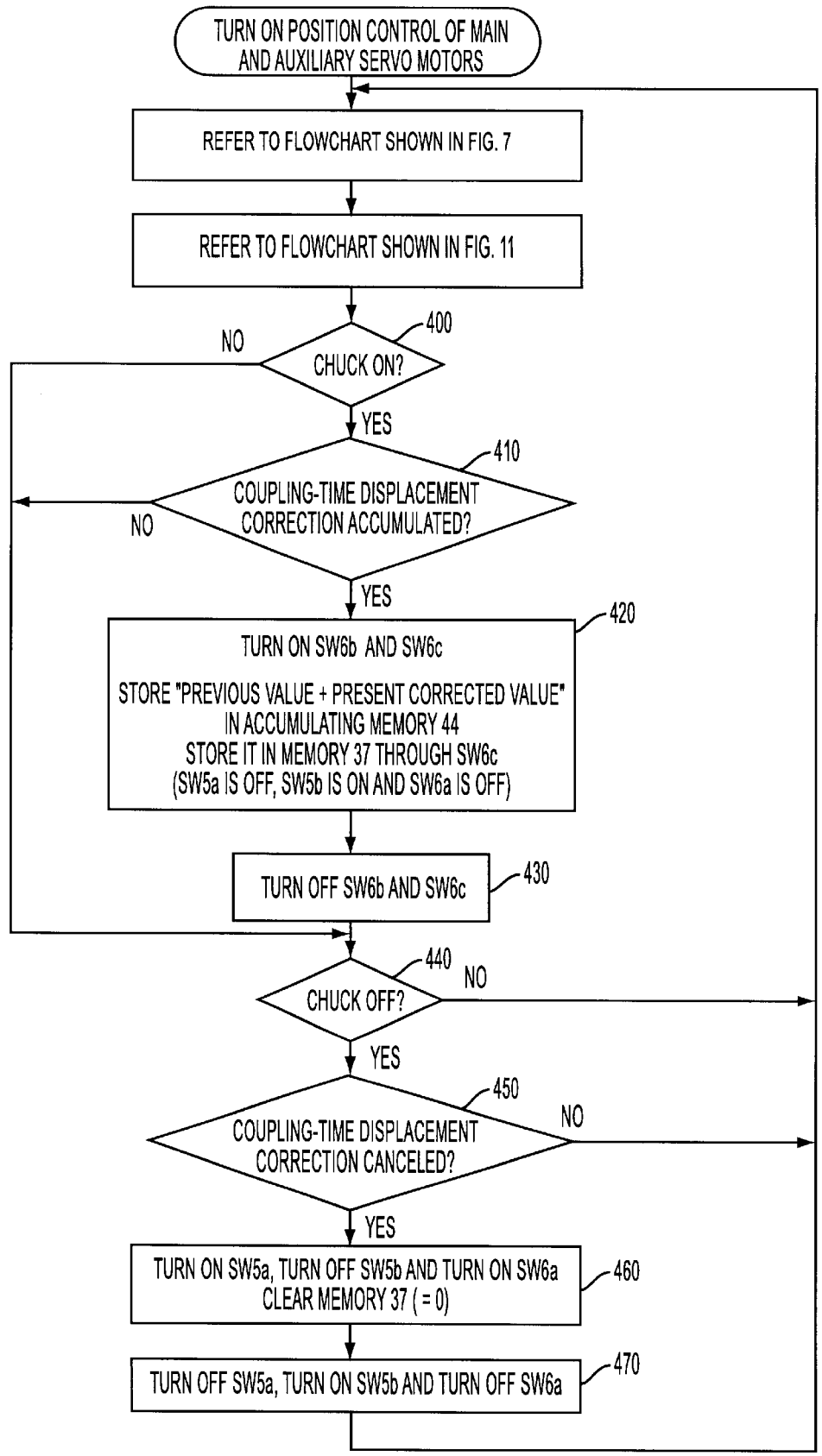
FIG. 13 is a flowchart showing a state of the respective switches shown in FIG. 12 and a correction processing of selecting a function of setting a correction added to the position command of the auxiliary spindle servo motor to 0 immediately after coupling, and a function of accumulating a displacement produced in each coupling to correct the position command of the auxiliary spindle servo motor without returning the position to a position immediately before coupling, when the main and auxiliary servo motors which have been coupled to each other through the workpiece shown in FIG. 5 are decoupled from each other.

FIG. 13 shows the detailed processing (5) of selecting a function of setting a correction added to the position command of the auxiliary spindle servo motor to 0 immediately after coupling, and a function of accumulating a displacement produced in each coupling to correct the position command of the auxiliary spindle servo motor without returning the position to a position immediately before coupling, when the main and auxiliary servo motors which have been coupled to each other through the workpiece are decoupled from each other.

In this processing, it is judged whether or not the chuck 21 of the auxiliary spindle 20 is turned on and both the spindles 10 and 20 are connected to each other through the workpiece 1 after the processing of the flowcharts shown in FIGS. 7 and 11 in a state where the chuck 11 of the main spindle 10 is turned on and nips the workpiece (step 400). If the chuck 21 is off ("no" in step 400), the operation jumps up to step 440. If the chuck 21 is on ("yes" in step 400), the position displacement correcting method at the time of coupling through the workpiece is judged (step 410).

If it is not of the accumulated type (the chuck 21 of the auxiliary spindle is turned off (workpiece coupling is decoupled) and a corrected value is arithmetically calculated again and stored at the time of turning on the chuck 21 again) ("no" in step 410), the operation jumps up to the step 440. On the other hand, if it is of the accumulated type (the chuck 21 of the auxiliary spindle is turned off (workpiece coupling is decoupled) and the present corrected value is accumulated in the previous corrected value and stored at the time of turning on the chuck 21 again) ("yes" in step 410), the switches SW6b and SW6c are turned on, and "previous value+present corrected value" is stored in the accumulating memory 44 and also stored in the memory 37 through the switch SW6c. In this situation, the switch states are that SW5a is off, SW5b is on, and SW6a is off (step 420). Then, the switches SW6b and SW6c are turned off (step 430).

Then, it is judged whether the chuck 21 of the auxiliary spindle 20 is turned off and both the spindles 10 and 20 are connected to each other through the workpiece 1, or not (step 440). If the chuck 21 is on ("no" in step 440), the operation returns to the initial operation and the above operation is repeated. If the chuck 21 is off ("yes" in step 440), it is judged whether the position displacement corrected value at the time of decoupling is canceled, or not (step 450). If cancel is not made ("no" in step 450), the operation returns to the initial operation and the above operation is repeated. If cancel is made ("yes" in step 450), the switch SW5a is turned on, the SW5b is turned off and the SW6a is turned on to clear the memory 37 to zero (step 460). Then, the switch SW5a is turned off, the SW5b is turned on and the SW6a is turned off, thus returning the respective switches to the original states (step 470). Thereafter, the operation returns to the initial operation and the above operation is repeated.

In other words, since this correction keeps an electric balance by displacing a reference point by a displacement produced when coupling, a phase difference occurs between both the spindles when the mechanical coupling is released. In general, it is preferable that the position is returned to an initial positional relation. If returning is made, the value in the memory is set to 0. If the displaced reference point is set as a new reference without returning the displacement produced at the time of coupling to the original position, the displacement produced in each coupling is accumulated and used as the corrected value. The switch SW6 is a switch that enables the selection of the functions for dealing with the displacement produced at the time of coupling. Because the position command in this description is of the absolute position system, the corrected data are merely added. However, if the position command is of the incremental value system, addition is ended at the time when the accumulation of the added position commands coincides with the corrected data.

Therefore, in the correction processing (4) of the synchronization control device in accordance with the embodiment 1, if the position command is corrected at the time of coupling, the position of the spindle is displaced by the corrected amount when coupling is released. However, the displacement can be returned to 0 according to the application or can be accumulated with the displaced position as a reference.

(6) A processing that can change the speed control to the position control and vice versa when the speed command is within a predetermined error.

Figure 14:
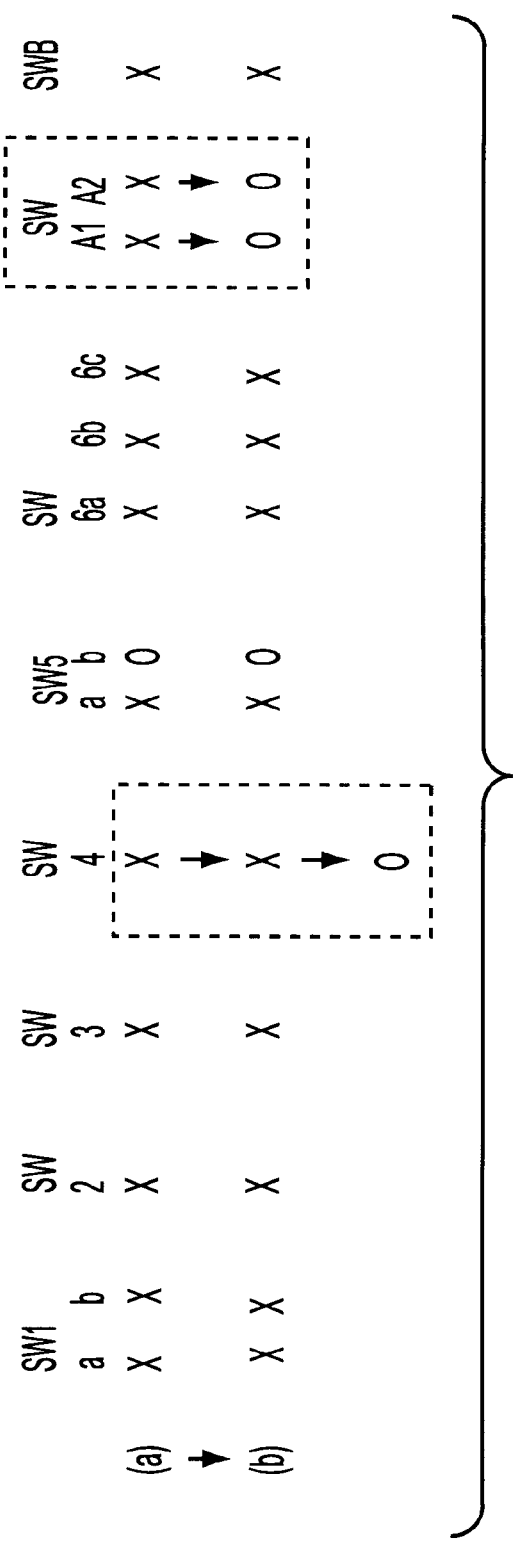
FIG. 14 is a state explanatory diagram showing a state of the respective SWs in the case of conducting a processing that can change the speed control to the position control and vice versa when the speed command is within a predetermined error.

FIG. 14 shows a state of the respective switches SW in the case of conducting a processing that can change the speed control to the position control and vice versa when the speed command is within a predetermined error.

Referring to FIG. 14, (a) shows a state of the respective switches SW in case of a speed control loop, and (b) shows a state of the respective switches SW in case of a position control loop. The switch SW4 is switched from an off-state (X) to an on-state (O) under the control by the comparator 36 even in the state of the position control loop (b).

In other words, assuming that operation is made in response to the speed command, in the switch state shown in FIG. 14, the main and auxiliary servo amplifiers 16 and 26 produce position droop signals which come to the speed commands corresponding to the speed of the spindles on the basis of the position information from the position detectors 15 and 25 of the main and auxiliary spindles 10 and 20.

A description will be given with reference to FIG. 2. The comparator 36 compares the output signal of the position gain multiplier 28 of the change gear ratio that constitutes the position control loop, that is, the change gear ratio with the servo motor 24 side as a numerator and the change gear ratio multiplier 29 with the speed command, and if a difference therebetween is within a permitted value, the control is switched to the position control by the switch SW4. On the other hand, if the difference therebetween is not within the permitted value, the control is switched from the position control to the speed control by the switch SW4.

For that reason, since the respective switches SW are switched in the above state, the position droop is added to the position detection signal of a machine driven by the servo motors to produce the position command, a difference between the speed command to the servo motors which is produced from that position command and the speed command during operation under the speed control is within a predetermined error, the control system of the servo motors can be switched from the speed control to the position control.

Figure 15:
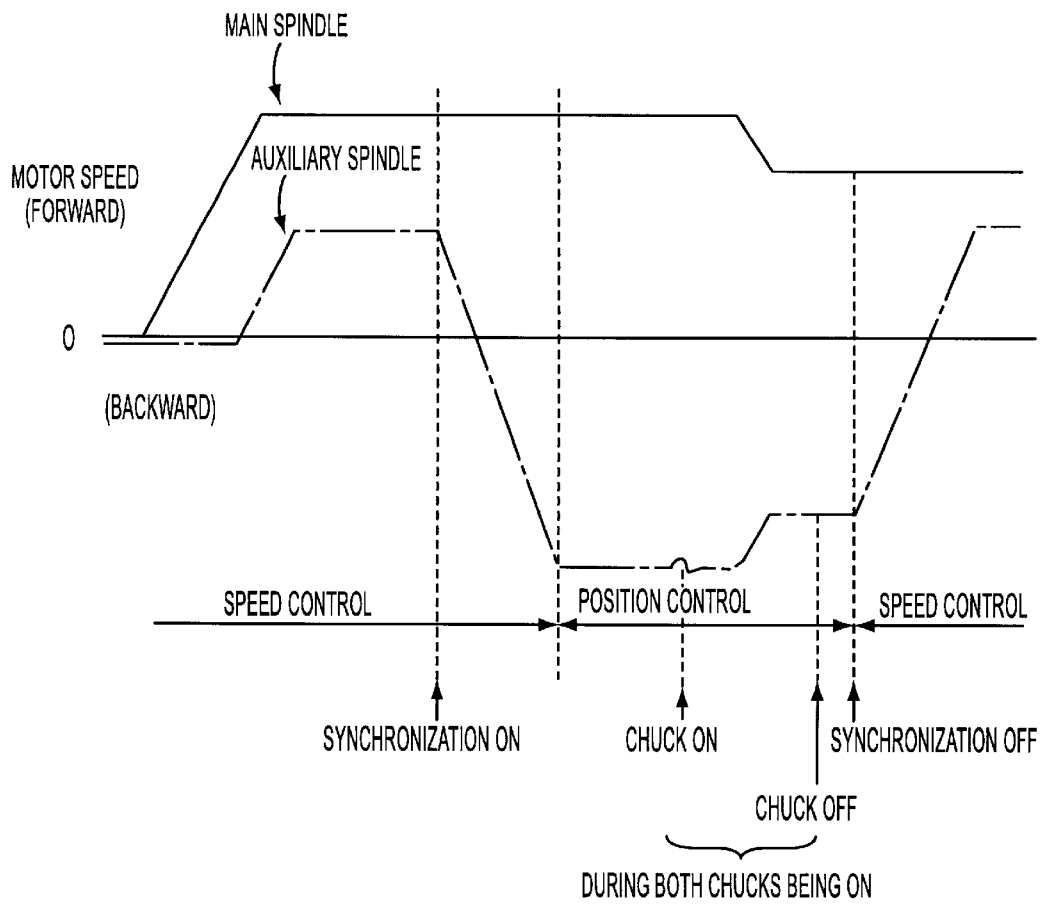
FIG. 15 is an explanatory diagram showing the speeds of the main servo motor and the auxiliary servo motor, and a switching state between the speed control and the position control due to the processing shown in FIG. 11.
Figure 16:
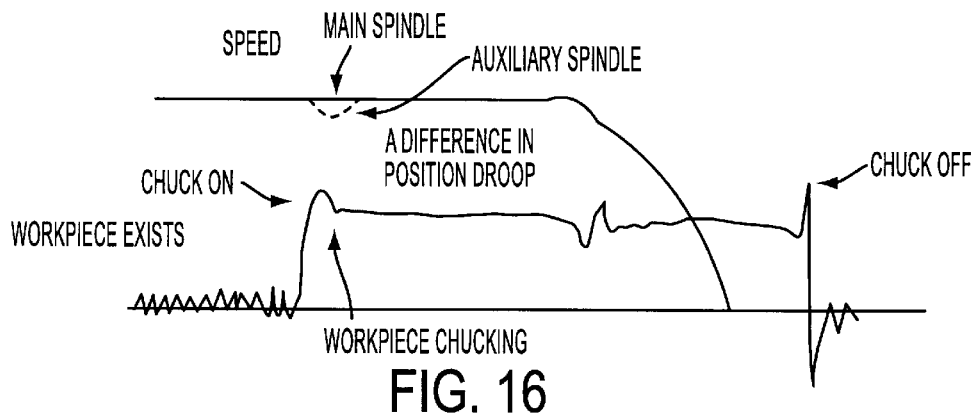
FIG. 16 is an explanatory diagram showing a change in a difference of the position droop before and after coupling when the main and auxiliary spindles are coupled to each other through the workpiece in the prior art.
Figure 17:
FIG. 17 is an explanatory diagram showing a change in the difference of the position droop in the case where there is no workpiece as compared with FIG. 16.

FIG. 15 shows the speeds of the main servo motor and the auxiliary servo motor and a switching state between the speed control and the position control due to the correction processing (6), in which the position control is made before and after chuck-on including at least on-chuck-on, and the speed control is made before and after the synchronization on and before and after the synchronization off.

Therefore, in the correction processing (6) of the synchronization control device in accordance with the embodiment 1, when the servo motor of the position control and the servo motor of the speed control are compared with each other in acceleration and deceleration characteristics, the acceleration/deceleration can be made by all the torque produced by the servo motors in the speed control, whereas all the torque produced cannot be used as the acceleration/deceleration torque with the limit of the acceleration/deceleration characteristics in the position control because the acceleration/deceleration characteristics influence the position. However, when the r.p.m. rises from an initial stop to a rated r.p.m., it rises under the speed control and after it reaches the rated r.p.m., the control is switched from the speed control to the position control, thereby being capable of shortening the acceleration period of time.

The above description of the embodiment 1, is made on a machining device having two spindles consisting of one main spindle 10 and an auxiliary spindle 20, respectively. However, if two or more spindles are provided, the main servo motor is fitted to one spindle, one of plural auxiliary servo motors and one main servo motor are coupled to each other while observing the position droops of both the servo motors, and thereafter another auxiliary servo motor and the main servo motor are coupled to each other. In this way, if the auxiliary servo motors are sequentially coupled to the main servo motor, it is not necessary to conduct the synchronization control of the main servo motor with one auxiliary servo motor with a limit at all.

Also, in the embodiment 1, as described above, the structure within the auxiliary servo amplifier 26 is improved without changing the structure within the main servo amplifier 16. Conversely, it is needless to say that the structure within the main servo amplifier 16 may be improved as described above, and the structure within the auxiliary servo amplifier 26 may not be changed.

As described above, according to the present invention, in the synchronization control device using a plurality of servo motors which can be mechanically coupled or decoupled through the workpiece, the respective position droops between one main servo motor and other auxiliary servo motors are compared with each other, and if the main servo motor and the auxiliary servo motor are not mechanically coupled to each other, a difference in the position droop with respect to the main servo motor is added to the position command of the auxiliary servo motor to correct the position. If the main servo motor and the auxiliary servo motor are mechanically coupled to each other through the workpiece, a value obtained by dividing a difference in the position droops between both the servo motors which are obtained in the operation before they are coupled to each other through the workpiece (the main servo motor value – the auxiliary servo motor value) by the speed of the auxiliary servo motor at the time of measurement is stored. If the main servo motor and the auxiliary servo motor are coupled to each other through the workpiece, a product value of a difference of the position droop per the unit speed and the speed of the servo motor is added to the position command of the auxiliary servo motor.

With the above operation, even if a plurality of servo motors are coupled to each other through the workpiece by means of a transmission mechanism of a flexible structure such as belting and a rapid acceleration or deceleration drive is made in synchronization in that state without changing the corrected value every time the speed of the servo motors changes, the torque of the servo motors can be realized without any loss caused by synchronization drive.

In other words, according to the present invention, a difference in position between the servo motors which are coupled to each other through the workpiece is grasped before mechanical coupling, and after coupling, control is made without any lag in a feed-forward manner, that is, in a manner that the data are installed in arithmetic operation in advance on the basis of the data grasped before coupling. Accordingly, even if the change gear ratio is not accurately determined due to the use of a belt as the transmission mechanism of a mechanical section which is driven by the servo motors, accurate synchronization drive is enabled, rapid acceleration and deceleration are enabled in the mechanical coupling state, and complete synchronization control can be conducted even in the acceleration/deceleration state.

As a result, in case of belting, since it is supposed that the belt is deteriorated with a time unlike to a gear, etc., if the r.p.m. is not so low in the state where the servo motors are decoupled from each other through the workpiece, data are updated and data to be used after coupling are prepared so as to cope with a deterioration with a time.

Also, the change gear ratio is obtained from the respective position droops of the main servo motor and the auxiliary servo motor and the difference in the droop between both the main and auxiliary servo motors is corrected by use of the change gear ratio. Therefore, in this case, although the number of places of decimals increases because of a normal difference within 1% and a memory of a large capacity is required, if accurate setting is made once, no correction is required even if the speed changes.

In other words, in the correcting method in the feed-forward manner, the difference in position is added to the position command for correction. In the method, the corrected value is required to be corrected in proportion to the speed, but if the total position gain which is a product of the position gain and the change gear ratio is corrected, the corrected value per se may not be changed while it is correct after changing. However, since the number of significant figures of decimals must be greatly increased in order to represent a slight error, this method needs to be selected according to circumstances. Since the present invention is directed to control in the case where the change gear ratio of the transmission mechanism is not accurately represented, the position control loop is a command to an object to be driven such as a spindle, the feedback signal is directly obtained from the movement of a machine, and the position gain constitutes the position control loop resulting from multiplying the position gain responsive to an end of the machine by the change gear ratio of the transmission mechanism.

Further, according to the present invention, the ratio in the position droop between both the main servo motor and the auxiliary servo motor which is obtained while the main servo motor and the auxiliary servo motor are decoupled from each other through the workpiece and drive (the value of the auxiliary servo motor is a denominator) is obtained, and when the main servo motor and the auxiliary servo motor are mechanically coupled to each other through the workpiece, the total position gain of the auxiliary servo motor (position gain×change gear ratio) is multiplied by the ratio of the above position-droops.

With the above operation, although it is supposed that what transmits a power with the flexible structure such as the belt of this type is deteriorated in constant with a time, since data used for correction are continuously updated to new data in the present invention, the correction can cope with a deterioration with a time. Also, since the position correction is made in a feed-forward manner, accurate synchronization drive can be made even in rapid acceleration or rapid deceleration after the main servo motor and the auxiliary servo motor are coupled to each other through the workpiece.

Still further, according to the present invention, a change (a value after coupling–a value before coupling) in a difference in the position droop between the main servo motor and the auxiliary servo motor (the position droop of the main servo motor and the position droop of the auxiliary servo motor) immediately after the main spindle and the auxiliary spindle are mechanically coupled to each other through the workpiece, before coupling and after coupling, can be added to the position command of the auxiliary servo motor.

With the above operation, a mechanical displacement which is liable to occur when coupling is made through the workpiece can be electrically treated without any problems. In other words, in the case where the main spindle and the auxiliary spindle are coupled to each other through the workpiece to conduct synchronization control in a state where the main and auxiliary servo motors are driven, the coupling is experientially frequently made in the displaced state as a result of coupling in a state where a displacement occurs during coupling work even if the servo motors are completely synchronized with each other before coupling. However, the displacement can be compensated without any problems even if such a mechanical displacement occurs.

Yet still further, according to the present invention, it is possible to select a function of setting a correction added to the position command of the auxiliary spindle servo motor to 0 immediately after coupling, and a function of correcting the position command of the auxiliary spindle servo motor to the accumulated value of displacements produced in each coupling as a corrected value at the time of coupling without correcting the position command at the time of decoupling, when the main and auxiliary servo motors which have been coupled to each other through the workpiece are decoupled from each other.

With the above operation, when the mechanical coupling through the workpiece is released, even if the position of the spindle is displaced by the corrected amount, the machine position can be returned to the original state with elimination of the displacement or an advancing function can be selected while the displacement state is set as a reference according to the application.

In other words, according to the present invention, when the main spindle and the auxiliary spindle are decoupled from each other, the displacement produced during coupling work is corrected to the original or the subsequent displacements are accumulated with the displaced position as a new reference according to the applied method. Since any of the above methods can be selected in the synchronization control according to the present invention, not only the inaccuracy of the change gear ratio of the transmission machine such as a belt can be solved, but also a correction for eliminating saturation of the torque caused by coupling with a temporally positional displacement during coupling work can be made. Thus, another problem to a quick response is also solved.

Yet still further, according to the present invention, the position droop is added to the position detection signal of a machine driven by the servo motors to produce the position command, and when a difference between the speed command to the servo motors which is produced from that position command and the speed command during operation under the speed control is within a predetermined error, the control system of the servo motors can be switched from the speed control to the position control.

With the above operation, when the r.p.m. rises from an initial stop to a rated r.p.m., it rises under the speed control and after it reaches the rated r.p.m., the control is switched from the speed control to the position control, thereby being capable of shortening the acceleration period of time.

In other words, when the servo motor of the position control and the servo motor of the speed control are compared with each other in acceleration and deceleration characteristics, the acceleration/deceleration can be made by all the torque produced by the servo motors in the speed control, whereas all the torque produced cannot be used as the acceleration/deceleration torque with the limit of the acceleration/deceleration characteristics in the position control because the acceleration/deceleration characteristics influence the position. Although the present invention is mainly directed to the position control, the torque which can be produced by the servo motors can be utilized at the maximum if the speed control is appropriately used.

INDUSTRIAL APPLICABILITY

As described above, according to the present invention, the position droops produced in the main and auxiliary servo motors when the main and auxiliary spindles are coupled to each other through the workpiece are obtained by the adders, respectively, a difference between those position droops is obtained by the comparator, the divider divides the position droop difference by the speed of the auxiliary servo motor at the time of detecting the position droop to obtain a position droop difference per a unit speed. Then, after both the spindles are coupled to each other, the multiplier multiplies the position droop difference by the present speed of the auxiliary servo motor, and the adder adds that value to the position command to the auxiliary servo motor. With the above structure, even if coupling is made through the workpiece and synchronization drive is made, an excessive torque can be prevented from occurring, and even if a difference occurs in the position droop between both the spindles when the main spindle and the auxiliary spindle are coupled to each other, accurate synchronization drive of the main spindle and the auxiliary spindle is enabled, and rapid acceleration or deceleration drive is enabled. In particular, even if a flexible structure such as a belt is used for a torque transmission between the main spindle and the servo motor, the synchronization control device which can automatically cope with a change of the change gear ratio with a time can be provided.

What is claimed is:

1. A synchronization control device for a servo motor comprising:

a main spindle and an auxiliary spindle each having a chuck that holds both ends of a workpiece and being coupled to or decoupled from each other through said workpiece;

a main servo motor and an auxiliary servo motor which rotationally drive said main spindle and said auxiliary spindle, respectively;

a main spindle position detector and an auxiliary spindle position detector which are fitted to said main spindle and said auxiliary spindle, respectively, and output a position feedback signal;

a main servo motor speed detector and an auxiliary servo motor speed detector which are fitted to said main servo motor and said auxiliary servo motor, respectively, and output a speed feedback signal;

a main servo amplifier and an auxiliary servo amplifier which drive said main servo motor and said auxiliary servo motor, respectively; and a numerical control unit which outputs a speed command and a position command to said main servo amplifier and said auxiliary servo amplifier, wherein each of said main servo amplifier and said auxiliary servo amplifier includes:

a position control section which outputs a position droop and the speed command responsive to the position droop on the basis of inputs of the position feedback signal from said position detector and the position command from said numerical control unit;

a speed control section which outputs a current command on the basis of the speed command from said position control section and the speed feedback signal from said speed detector; and a current control section which controls a supply current to the motor on the basis of the current command from said speed control section and the current feedback signal which flows in the motor, wherein said auxiliary servo amplifier further includes a position correction section which obtains position correction data based on a difference in position droop between the main spindle position droop and the auxiliary spindle position droop and based on the speed feedback signal from the speed detector of said auxiliary servo motor when said main servo motor and said auxiliary servo motor rotate in a state where said main spindle and said auxiliary spindle are decoupled from each other, and wherein the position control section of said auxiliary servo amplifier adds the position correction data from said position correction section to the position droop and outputs the speed command responsive to the position droop obtained by addition when said main spindle and said auxiliary spindle are coupled to each other through said workpiece, and said main servo motor and said auxiliary servo motor rotate in synchronization with each other.

2. The synchronization control device for a servo motor as claimed in claim 1, characterized in that said position correction section includes:

comparing means for obtaining a position droop difference between the main spindle position droop and the auxiliary spindle position droop when said main servo motor and said auxiliary servo motor rotate in a state where said main spindle and said auxiliary spindle are decoupled from each other;

dividing means for dividing the position droop difference from said comparing means by the speed feedback signal from said speed detector of said auxiliary servo motor;

memory means for storing a division value from said dividing means, multiplying means for multiplying the division value stored in said memory means by the speed feedback signal from said speed detector of said auxiliary servo motor; and switch means for switching so as to output, as the position correction data which are outputted to said position control section of said auxiliary servo amplifier, the position droop difference from said comparing means when said main servo motor and said auxiliary servo motor rotate in a state where said main spindle and said auxiliary spindle are decoupled from each other, and to output, as the position correction data which are outputted to said position control section of said auxiliary servo amplifier, a multiplication value from said multiplying means when said main spindle and said auxiliary spindle are coupled to each other through said workpiece, and said main servo motor and said auxiliary servo motor rotate.

3. The synchronization control device for a servo motor as claimed in claim 1, characterized in that said position correction section includes:

position droop ratio calculating means for calculating the ratio of the position droop of said main spindle to the position droop of said auxiliary spindle when said main servo motor and said auxiliary servo motor rotate in a state where said main spindle and said auxiliary spindle are decoupled from each other; and memory means for storing the position droop ratio from said position droop ratio calculating means; wherein said position control section includes:

position droop calculating means for calculating the position droop of said auxiliary spindle on the basis of inputs of the position feedback signal from said position detector and the position command from said numerical control unit;

position gain multiplying means for multiplying the position droop from said position droop calculating means by a position gain of said auxiliary servo motor which is stored in advance;

change gear ratio multiplying means for multiplying a multiplication output from said position gain multiplying means by a change gear ratio of said auxiliary servo motor which is stored in advance; and change gear ratio correcting means for correcting the change gear ratio by multiplying the change gear ratio which is stored in said change gear ratio multiplying means in advance by the position droop ratio which is stored in said memory means when said main spindle and said auxiliary spindle are coupled to each other through said workpiece, and said main servo motor and said auxiliary servo motor rotate in synchronization with each other.

4. The synchronization control device for a servo motor as claimed in claim 3, characterized in that said change gear ratio correcting means includes a filter which subjects the position droop ratio stored in said memory means to a first-order lag processing.

5. The synchronization control device for a servo motor as claimed in claim 1, characterized in that said position correction section includes:

position droop ratio calculating means for calculating the ratio of the position droop of said main spindle to the position droop of said auxiliary spindle when said main servo motor and said auxiliary servo motor rotate in a state where said main spindle and said auxiliary spindle are decoupled from each other; and memory means for storing the position droop ratio from said position droop ratio calculating means; wherein said position control section includes:

position droop calculating means for calculating the position droop of said auxiliary spindle on the basis of inputs of the position feedback signal from said position detector and the position command from said numerical control unit;

position gain multiplying means for multiplying the position droop from said position droop calculating means by a position gain of said auxiliary servo motor which is stored in advance;

change gear ratio multiplying means for multiplying a multiplication output from said position gain multiplying means by a change gear ratio of said auxiliary servo motor which is stored in advance; and position gain correcting means for correcting the position gain by multiplying the position gain which is stored in said position gain multiplying means in advance by the position droop ratio which is stored in said memory means when said main spindle and said auxiliary spindle are coupled to each other through said workpiece, and said main servo motor and said auxiliary servo motor rotate in synchronization with each other.

6. The synchronization control device for a servo motor as claimed in claim 5, characterized in that said position gain correcting means includes a filter which subjects the position droop ratio stored in said memory means to a first-order lag processing.

7. The synchronization control device for a servo motor as claimed in claim 2, characterized in that said position correction section stores, in said memory means, a division value obtained from dividing the position droop difference from said comparing means by the speed feedback signal from the speed detector of said auxiliary servo motor when said main servo motor and said auxiliary servo motor rotate by a predetermined r.p.m. or higher in a state where said main spindle and said auxiliary spindle are decoupled from each other.

8. The synchronization control device for a servo motor as claimed in claim 3, characterized in that said position correction section stores in said memory means the position droop ratio from said position droop ratio calculating means when said main servo motor and said auxiliary servo motor rotate by a predetermined r.p.m. or higher in a state where said main spindle and said auxiliary spindle are decoupled from each other.

9. The synchronization control device for a servo motor as claimed in claim 2, characterized in that said position correction section further includes:

a switch disposed between said multiplying means and said storing means, said switch being closed when said main servo motor and said auxiliary servo motor rotate in a state where said main spindle and said auxiliary spindle are decoupled from each other, said switch being opened when said main spindle and said auxiliary spindle are coupled to each other through said workpiece, and said main servo motor and said auxiliary servo motor rotate;

a subtractor which subtracts, from the position droop from said comparing means, the position droop due to the multiplication value from said multiplying means that multiplies the division value stored in said memory means through said switch by the speed feedback signal from said speed detector of said auxiliary servo motor when said main spindle and said auxiliary spindle are coupled to each other through said workpiece, and said main servo motor and said auxiliary servo motor rotate; and a coupling-time displacement correction section which outputs a difference, in the position droop between said main spindle and said auxiliary spindle which is obtained from said subtractor and produced before and after said main spindle and said auxiliary spindle are coupled to each other through said workpiece, to said position control section as the position correction data.

10. The synchronization control device for a servo motor as claimed in claim 9, characterized in that said coupling-time displacement correction section further includes:

zero data generating means for generating zero data as the position correction data; and accumulating means for accumulating the position correction data from said subtractor which are produced every time said main spindle and said auxiliary spindle are coupled to each other through the workpiece, wherein when said coupling-time displacement correction section outputs the zero data from said zero data generating means or the position correction data from said accumulating means as the position correction data which are outputted to said position control section immediately after coupling, when said main spindle and said auxiliary spindle which have been coupled to each other through said workpiece, are decoupled from each other.

11. The synchronization control device for a servo motor as claimed in claim 1, further comprising:

a comparator which compares the speed command from said position control section with the speed command from said numerical control section; and command switching means for outputting the speed command from said position control section to said speed control section in order to conduct position control when a comparison difference is within a given error, and for outputting the speed command from said numerical control section to said speed control section in order to conduct position control when the comparison difference is not within the given error.

12. The synchronization control device for a servo motor as claimed in claim 1, wherein said position correction section comprises:

a comparator operative to obtain a position droop difference between the main spindle position droop and the auxiliary spindle position droop when said main servo motor and said auxiliary servo motor rotate in a state where said main spindle and said auxiliary spindle are decoupled from each other;

a divider operative to divide the position droop difference from said comparator by the speed feedback signal from said speed detector of said auxiliary servo motor;

a memory operative to store a division value from said divider, a multiplier operative to multiply the division value stored in said memory by the speed feedback signal from said speed detector of said auxiliary servo motor; and a switch operative to switch so as to output, as the position correction data which are outputted to said position control section of said auxiliary servo amplifier, the position droop difference from said comparator when said main servo motor and said auxiliary servo motor rotate in a state where said main spindle and said auxiliary spindle are decoupled from each other, and to output, as the position correction data which are outputted to said position control section of said auxiliary servo amplifier, a multiplication value from said multiplier when said main spindle and said auxiliary spindle are coupled to each other through said workpiece, and said main servo motor and said auxiliary servo motor rotate.

13. The synchronization control device for a servo motor as claimed in claim 1, wherein said position correction section comprises:

a position droop ratio calculator operative to calculate the ratio of the position droop of said main spindle to the position droop of said auxiliary spindle when said main servo motor and said auxiliary servo motor rotate in a state where said main spindle and said auxiliary spindle are decoupled from each other; and a memory operative to store the position droop ratio from said position droop ratio calculator;

and wherein said position control section includes:

a position droop calculator operative to calculate the position droop of said auxiliary spindle on the basis of inputs of the position feedback signal from said position detector and the position command from said numerical control unit;

a position gain multiplier operative to multiply the position droop from said position droop calculator by a position gain of said auxiliary servo motor which is stored in advance;

a change gear ratio multiplier operative to multiply a multiplication output from said position gain multiplier by a change gear ratio of said auxiliary servo motor which is stored in advance; and a change gear ratio corrector operative to correct the change gear ratio by multiplying the change gear ratio which is stored in said change gear ratio multiplier in advance by the position droop ratio which is stored in said memory when said main spindle and said auxiliary spindle are coupled to each other through said workpiece, and said main servo motor and said auxiliary servo motor rotate in synchronization with each other.

14. The synchronization control device for a servo motor as claimed in claim 13, wherein said change gear ratio corrector includes a filter operative to subject the position droop ratio stored in said memory to a first-order lag processing.

15. The synchronization control device for a servo motor as claimed in claim 1, wherein said position correction section includes:

a position droop ratio calculator operative to calculate the ratio of the position droop of said main spindle to the position droop of said auxiliary spindle when said main servo motor and said auxiliary servo motor rotate in a state where said main spindle and said auxiliary spindle are decoupled from each other; and a memory operative to store the position droop ratio from said position droop ratio calculator;

and wherein said position control section includes:

a position droop calculator operative to calculate the position droop of said auxiliary spindle on the basis of inputs of the position feedback signal from said position detector and the position command from said numerical control unit;

a position gain multiplier operative to multiply the position droop from said position droop calculator by a position gain of said auxiliary servo motor which is stored in advance;

a change gear ratio multiplier operative to multiply a multiplication output from said position gain multiplier by a change gear ratio of said auxiliary servo motor which is stored in advance; and a position gain corrector operative to correct the position gain by multiplying the position gain which is stored in said position gain multiplier in advance by the position droop ratio which is stored in said memory when said main spindle and said auxiliary spindle are coupled to each other through said workpiece, and said main servo motor and said auxiliary servo motor rotate in synchronization with each other.

16. The synchronization control device for a servo motor as claimed in claim 15, wherein said position gain corrector includes a filter which is operative to subject the position droop ratio stored in said memory to a first-order lag processing.

17. The synchronization control device for a servo motor as claimed in claim 12, wherein said position correction section is operative to store, in said memory, a division value obtained from dividing the position droop difference from said comparator by the speed feedback signal from the speed detector of said auxiliary servo motor when said main servo motor and said auxiliary servo motor rotate by a predetermined r.p.m. or higher in a state where said main spindle and said auxiliary spindle are decoupled from each other.

18. The synchronization control device for a servo motor as claimed in claim 13, wherein said position correction section is operative to store in said memory the position droop ratio from said position droop ratio calculator when said main servo motor and said auxiliary servo motor rotate by a predetermined r.p.m. or higher in a state where said main spindle and said auxiliary spindle are decoupled from each other.

19. The synchronization control device for a servo motor as claimed in claim 12, wherein said position correction section further includes:

a switch disposed between said multiplier and said memory, said switch being closed when said main servo motor and said auxiliary servo motor rotate in a state where said main spindle and said auxiliary spindle are decoupled from each other, said switch being opened when said main spindle and said auxiliary spindle are coupled to each other through said workpiece, and said main servo motor and said auxiliary servo motor rotate;

a subtractor which subtracts, from the position droop from said comparator, the position droop due to the multiplication value from said multiplier that multiplies the division value stored in said memory through said switch by the speed feedback signal from said speed detector of said auxiliary servo motor when said main spindle and said auxiliary spindle are coupled to each other through said workpiece, and said main servo motor and said auxiliary servo motor rotate; and a coupling-time displacement correction section which outputs a difference in the position droop between said main spindle and said auxiliary spindle which is obtained from said subtractor and produced before and after said main spindle and said auxiliary spindle are coupled to each other through said workpiece to said position control section as the position correction data.

20. The synchronization control device for a servo motor as claimed in claim 19, wherein said coupling-time displacement correction section further includes:

a zero data generator operative to generate zero data as the position correction data; and an accumulator operative to accumulate the position correction data from said subtractor which are produced every time said main spindle and said auxiliary spindle are coupled to each other through the workpiece;

and wherein when said coupling-time displacement correction section outputs the zero data from said zero data generator or the position correction data from said accumulator as the position correction data which are outputted to said position control section immediately after coupling when said main spindle and said auxiliary spindle, which have been coupled to each other through said workpiece, are decoupled from each other.

21. The synchronization control device for a servo motor as claimed in claim 1, further comprising:

a comparator which compares the speed command from said position control section with the speed command from said numerical control section; and a command switch operative to output the speed command from said position control section to said speed control section, in order to conduct position control when a comparison difference is within a given error, and operative to output the speed command from said numerical control section to said speed control section, in order to conduct position control when the comparison difference is not within the given error.

* * * * *